(12) United States Patent
Merritt

(10) Patent No.: US 6,801,076 B1
(45) Date of Patent: Oct. 5, 2004

(54) HIGH OUTPUT HIGH EFFICIENCY LOW VOLTAGE CHARGE PUMP

(75) Inventor: Todd A. Merritt, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/560,121

(22) Filed: Apr. 28, 2000

(51) Int. Cl.$^7$ ............................................... G05F 1/10
(52) U.S. Cl. ........................................ 327/536; 363/60
(58) Field of Search ................................ 327/536, 537, 327/259, 589; 363/59, 60; 307/110; 365/203

(56) References Cited

U.S. PATENT DOCUMENTS

| | | | |
|---|---|---|---|
| 5,126,590 A | 6/1992 | Chern ........................ | 327/536 |
| 5,172,013 A | 12/1992 | Matsumura .............. | 307/296.2 |
| 5,537,306 A | 7/1996 | Blodgett ...................... | 363/60 |
| 5,642,073 A | 6/1997 | Manning .................... | 327/536 |
| 5,677,645 A * | 10/1997 | Merritt ........................ | 327/536 |
| 5,692,164 A * | 11/1997 | Pantelakis ................... | 327/536 |
| 5,828,095 A * | 10/1998 | Merritt ........................ | 365/222 |
| 5,831,470 A * | 11/1998 | Park et al. .................. | 327/536 |
| 5,939,935 A | 8/1999 | Merritt ........................ | 327/536 |
| 5,943,226 A | 8/1999 | Kim ............................ | 363/60 |
| 6,023,187 A * | 2/2000 | Camacho et al. ........... | 327/536 |
| 6,055,193 A | 4/2000 | Manning et al. ....... | 365/189.11 |
| 6,075,402 A * | 6/2000 | Ghilardelli et al. ......... | 327/536 |
| 6,121,822 A | 9/2000 | Merritt ........................ | 327/536 |
| 6,208,197 B1 | 3/2001 | Ternullo, Jr. et al. ....... | 327/536 |
| 6,225,854 B1 * | 5/2001 | Cha ............................ | 327/536 |
| 6,229,381 B1 * | 5/2001 | Keeth .......................... | 327/536 |
| 6,285,241 B1 | 9/2001 | Yoshida ....................... | 327/536 |
| 2001/0035787 A1 | 11/2001 | Merritt et al. .............. | 327/536 |

* cited by examiner

Primary Examiner—Kenneth B. Wells
(74) Attorney, Agent, or Firm—Schwegman, Lundberg, Woessner & Kluth, P.A.

(57) ABSTRACT

The charge pump circuit includes an oscillator to generate an oscillating signal. The charge pump circuit further includes a primary phase generator, which receives the oscillating signal and generates first and a second phase signals that are non-overlapping and crossing around their high points. The primary phase generates further generates third and fourth phase signals that non-overlapping and crossing around their low points. The charge pump circuit further includes a secondary phase generator, which receives the first and second phase signals from the primary phase generator and generates delayed fifth and sixth phase signals. The charge circuit further includes first and second pre-boot precharge capacitors, which receive the first and second phase signals. The charge circuit further includes first and second pre-boot capacitors, which receive the first and second phase signals, and is further precharged by the first and second pre-boot precharge capacitors respectively during a first phase and a second phase respectively to a first pre-determined level. The charge pump further includes first and second main pump precharge capacitors, which receive the first and second phase signals from the primary phase generator during the first and second phases respectively. The charge pump circuit further includes first and second main pump capacitors for outputting the charge. According to one embodiment, the charge pump is generally prebooting one of the main pump capacitors to a predetermined boot level, while it is outputting the charge from the other main pump capacitor. As a result, the pre-boot time is hidden during a charge out. This enables the charge pump to run at a faster cycle time which can result in a higher output. This can also enable the charge pump to produce more charge for a given size of a capacitor.

42 Claims, 15 Drawing Sheets

HIGH OUTPUT HIGH EFFICIENCY LOW VOLTAGE CHARGE PUMP

FIELD OF THE INVENTION

The present invention relates generally to semiconductor integrated circuits. More particularly, it pertains to charge pumps.

BACKGROUND OF THE INVENTION

System designs are routinely constrained by a limited number of readily available power supply voltages ($V_{cc}$). For example, consider a portable computer system powered by a conventional battery having a limited power supply voltage. For proper operation, different components of the system, such as display, processor, and memory components employ diverse technologies which require power to be supplied at various operating voltages. Components often require operating voltages of a greater magnitude than the power supply voltage and, in other cases, a voltage of reverse polarity. The design of a system, therefore, includes power conversion circuitry to efficiently develop the required operating voltages. One such power conversion circuit is known as a charge pump. Charge pumps have been used as on-chip voltage generators capable of providing a voltage more positive than the most positive external supply or more negative than the most negative external supply. The demand for highly efficient and reliable charge pump circuits has increased with the increasing number of applications utilizing battery powered systems, such as notebook computers, portable telephones, security devices, battery-backed data storage devices remote controls, instrumentation, and patient monitors, to name a few.

Inefficiencies in conventional charge pumps lead to reduced system capability and lower system performance in both battery and non-battery operated systems. Inefficiency can adversely affect system capabilities e.g., limited battery life, excess heat generation and high operating costs. Examples of lower system performance include low speed operation, excessive operating delays, loss of data, limited communication range, and inability to operate over wide variations in ambient conditions including ambient light level and temperature.

In addition to constraints on the number of power supply voltages available for system design, there is increasing demand for reducing magnitudes of the power supply voltages due to shrinking die size and also to save power. The demand in diverse application areas requires highly efficient charge pumps that operate from a supply voltage of around one volt.

Thus, there is a need for a low voltage charge pump that can operate at supply voltages less than one volt while reducing the die area and increasing the power efficiency.

SUMMARY OF THE INVENTION

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

Other aspects of the invention will be apparent on reading the following detailed description of the invention and viewing the drawings that form a part thereof.

The charge pump of the present invention provides, among other things, a high output high efficiency low voltage charge pump. According to one embodiment, it has two staggered phase generators which act together with a delay to produce non-overlapping signals required to drive charge and precharge capacitors to work around a supply voltage of 1.0 Volts ($V_{cc}$), to provide a higher output voltage and superior current per unit area.

An illustrative embodiment includes a charge pump circuit. The charge pump circuit includes an oscillator to generate an oscillating signal. The charge pump circuit further includes a primary phase generator, which receives the oscillating signal and generates a first and a second phase signals that are non-overlapping and crossing around their high points. The primary phase generator further generates a third and fourth phase signals that are non-overlapping and crossing around their low points. The charge pump circuit further includes a secondary phase generator, which receives the first and second phase signals from the primary phase generator, and generates a fifth and sixth phase signals that are similar to the first and second phase signals and having a predetermined delay from the first and second phase signals. The charge circuit further includes a first and second pre-boot precharge capacitors, which receive the third and fourth phase signals from the primary phase generator. The charge pump circuit further includes a first and second pre-boot capacitors, which receive the first and second phase signals from the primary phase generator, and is further precharged by the first and second pre-boot precharge capacitors during a first phase and a second phase respectively to a first pre-determined level. The charge pump further includes a first and second main pump precharge capacitors, which receive the first and second phase signals during the first and second phases. The charge pump circuit further includes a first and second main pump capacitors for outputting the charge. The first and second man pump precharge capacitors precharge the first and second main pump capacitors to a second pre-determined level respectively. According to one embodiment, the charge pump is generally prebooting one of the main pump capacitors to a predetermined boot level, while it is outputting the charge from the other main pump capacitor when it receives the one of the phase signals from the secondary phase generator which boots the main pump cap to a third predetermined level. As a result, the pre-boot time is hidden during a charge out This enables the charge pump to run at a faster cycle time which can result in a higher output. This also enables the charge pump to produce more charge for a given size of a capacitor. Other aspects of the invention will be apparent on reading the following detailed description of the invention and viewing the drawings that form a part thereof.

BRIEF DESCRIPTION OF THE DRAWINGS

In the drawings, like numerals describe substantially similar components throughout the several views. Like numerals having different letter suffixes represent different instances of substantially similar components.

DESCRIPTION OF THE EMBODIMENTS

Figure 1:
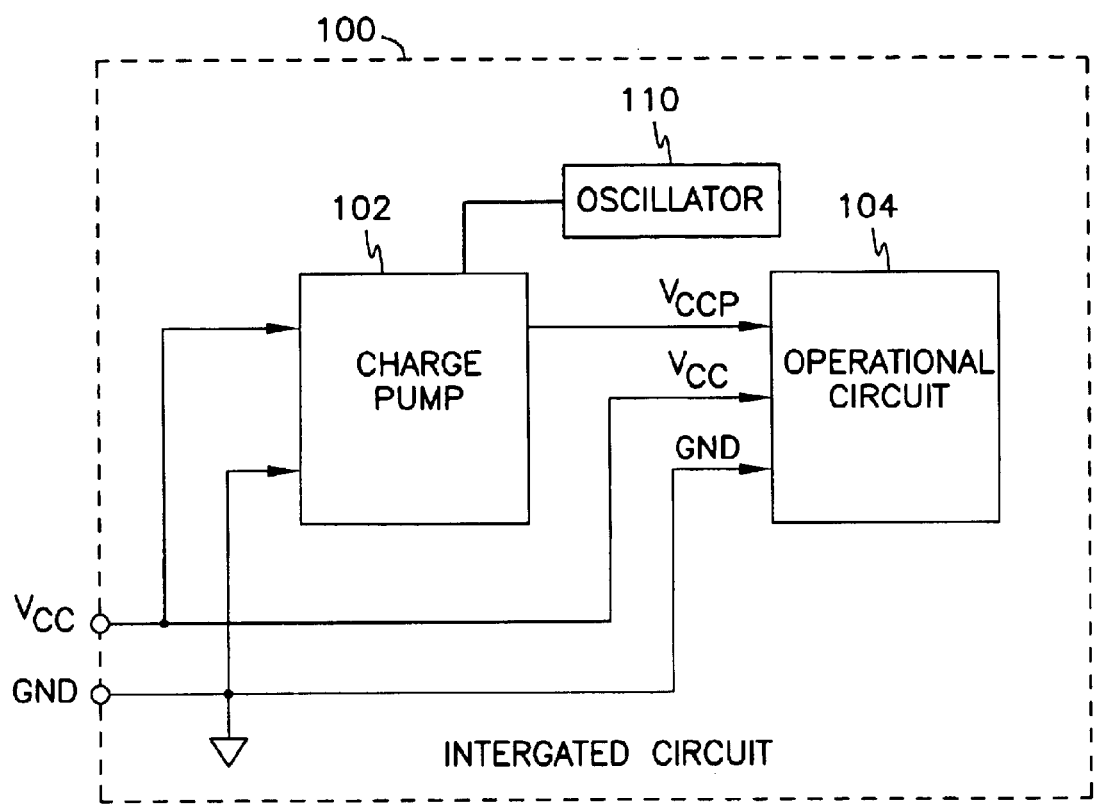
FIG. 1 is a block diagram illustrating generally one embodiment of an integrated circuit of the present invention.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

The transistors described herein include transistors from bipolar-junction technology (BJT), field effect technology (FET), or complimentary metal-oxide-semiconductor (CMOS). A metal-oxide-semiconductor (MOS) transistor includes a gate, a first node (drain) and a second node (source). Since a MOS transistor is typically a symmetrical device, the true designation of "source" and "drain" is only possible once voltage is impressed on the terminals. The designations of source and drain herein should be interpreted, therefore, in the broadest sense.

The charge pump circuit here described is a two phase circuit, therefore only one half of the charge pump is producing $V_{ccp}$ at any given time. The "first phase" is herein defined as the time when output IN1 is high and the "second phase" is defined as the time when the output IN2 is high.

The terms "crossing around their high points" and "high-high crossing points" refers to the crossing of the first and second signals around their high points of the signals generated by the first and second primary phase generators. Also the phases for the first and second main pump capacitors generally cross high-high for optimum efficiency of the charge pump.

The term "phase generator" means an oscillator to generate a first phase and a second phase during a phase cycle.

The terms "crossing around their low points" and "low-low crossing points" refers to the crossing of the first and second signals around low points of the signals generated by the first and second primary phase generators. Also the phases for the precharge caps generally cross low-low for optimum efficiency of the charge pump.

The term "pre-charging capacitors/device" described herein includes any devices capable of providing charges to maintain a predetermined level of charges in an energy-storing device while a system that includes the energy-storing device is turned off. The reason for pre-charging is thus: the energy-storing device may have to store a large amount of charges to enable a charge pump circuit to provide a high-voltage signal. Without pre-charging, an undesired amount of time may have to be taken once the system is turned on to charge the energy-storing device. The pre-charging device described herein can be a square-law device. The pre-charging device described herein can be any transistor fabricated on an integrated circuit using any fabrication technique. The pre-charging device described herein however, may be fabricated as an n-channel transistor with its drain and gate connected together; the drain is connected to an external supply.

The terms "pre-boot capacitors" and "pre-boosting stages" described herein includes any devices capable of providing charges to maintain a predetermined level of charges in an energy storing device while a system that includes the energy-storing device is turned off. Pre-boot capacitors are used first to boot the first and second main pump capacitors to a predetermined boot level. While the first main capacitor is outputting a charge in the first phase, the pre-boot is booting the second main capacitor to a predetermined boot level in the second phase and vice-versa. This process hides the pre-boot time and enables the charge pump circuit to run at a faster cycle time resulting in outputting more charge for a given size of a capacitor.

The term "booting" described herein refers to the principle that the charge on a capacitor cannot change instantaneously. This is, if the voltage on a first side of capacitor is instantaneously increased, the second side of the capacitor will increase by the same amount. The voltage on the second side of the capacitor is therefore "booted" higher.

The term "main energy storing device" means the main pump capacitor that outputs a desired level of a high-voltage signal during the first or second phase of a phase cycle.

The embodiments of the present invention generate higher voltage at a high efficiency by a charge pump using a low voltage supply.

FIG. 1 is a block diagram of a device illustrating generally one embodiment of the present invention. The device 100 has a charge pump 102, an oscillator 110, and operational circuit 104. The operational circuit 104 can be any functional circuit; for example, a memory device such as a dynamic random access memory (DRAM) or flash memory. The charge pump 102 converts $V_{cc}$ provided by an external power supply into a higher potential $V_{ccp}$. The operational circuit 104, therefore, has both $V_{cc}$ and $V_{ccp}$ available.

Figure 2:
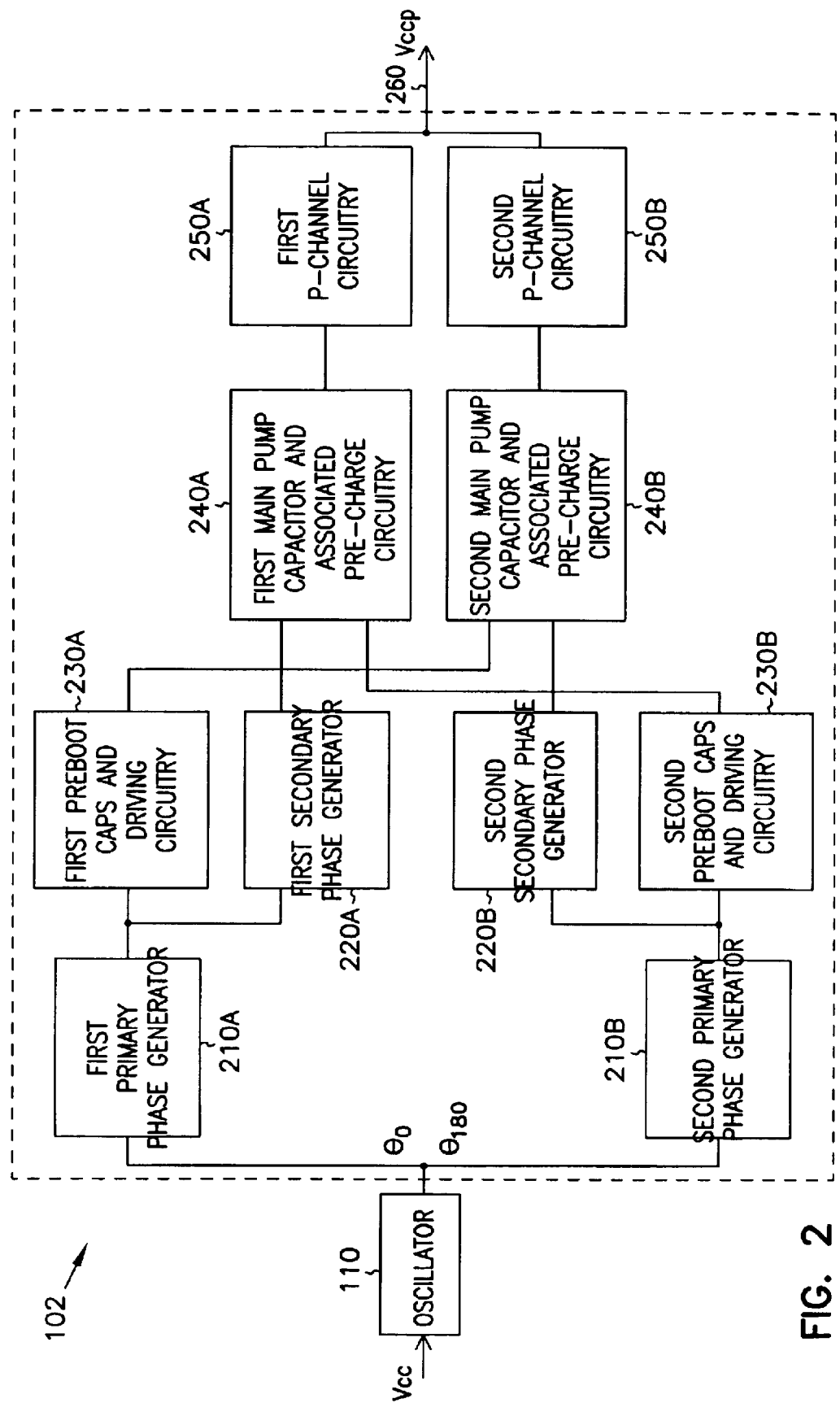
FIG. 2 is a block diagram illustrating generally one embodiment of a charge pump of the present invention.

FIG. 2 is a block diagram of a two phase charge pump circuit 102 illustrating generally one embodiment of the present invention. The charge pump circuit 102 includes a plurality of phase generators. The plurality of phase generators further including first and second primary phase generators 210A and 210B which receive an oscillating signal from an oscillator 110, and generates a first and a second phase signal having a high-high crossing point, and a third and a fourth phase signal having a low-low signal crossing point.

In one embodiment, at node 260, a capacitor may be placed upon the node 260 to ground for noise filtering. However, in other embodiments, linear, non-linear, or a combination of linear and non-linear elements may be placed upon the node 260 to function as an output load.

The charge pump circuit 102 further includes a first and a second secondary phase generator 220A and 220B, which receive the first and second phase signals having the high-high crossing point and generates delayed fifth and sixth phase signals similar to the first and second phase signals, having a high-high crossing point respectively. The charge pump circuit 102 further includes first and second pre-boot caps and associated driving circuitry 230A and 230B, which receive the first and second phase signals having high-high crossing points, and third and fourth phase signals having low-low crossing points. The charge pump circuit 102 further includes a first and a second main pump capacitor and associated pre-charge circuitry 240A and 240B, which receive the delayed fifth and sixth phase signals having the high-high crossing points from the first and second secondary phase generators 220A and 220B respectively. In a typical charge cycle, during the first phase, the first main pump capacitor 240A receives the fifth delayed phase signal having high-high crossing point from the first secondary phase generator 220A and outputs a charge to a first p-channel circuitry 250A, while the second main pump capacitor 240B is getting prebooted to a predetermined booted level by the first pre-boot capacitor 230A. In the same charge cycle, during the second phase the prebooted second main pump capacitor receives the delayed sixth phase signal from the second secondary phase generator 220B and outputs the charge to a second p-channel circuitry 250B, while the first main pump capacitor 240A is getting pre-booted to the predetermined booted level by the second pre-boot circuitry 230B. This process repeats itself every charge cycle and generally hides the preboot time required to pre-boot the first and second main capacitors 240A and 240B. As a result of staggered phase generators, the pre-boot circuitry 230A and B, and p-channel output circuitry 250A and B, the charge pump circuitry 102 can operate at supply voltages less than 1.0 Volts, and run at a faster cycle time, resulting in outputting more charge for a given size of a capacitor.

Figure 3A:
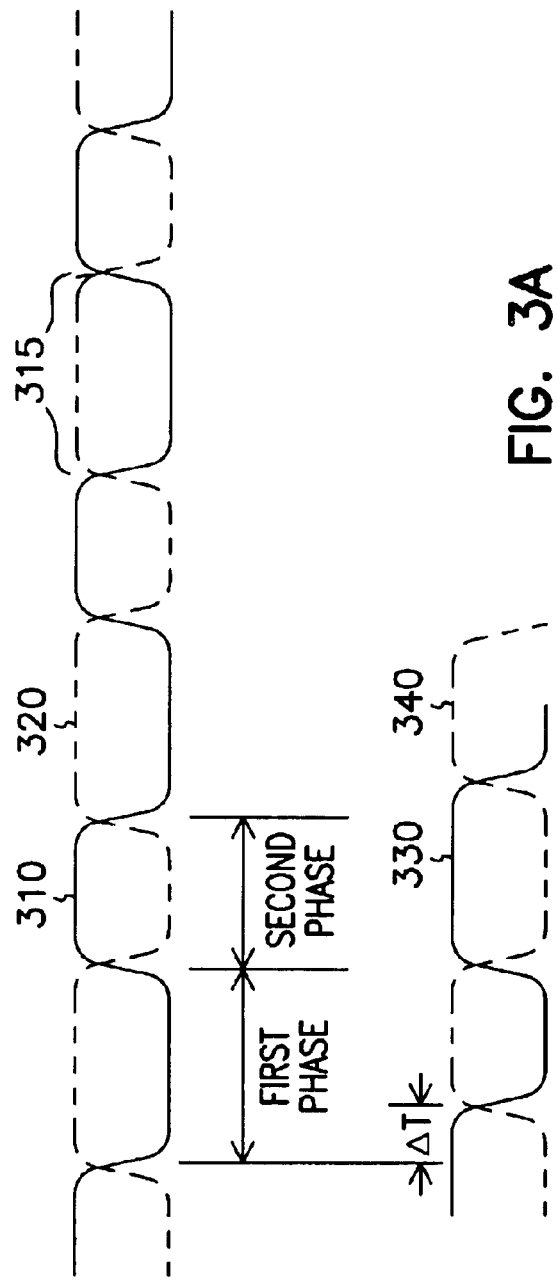
FIG. 3A is a timing diagram illustrating generally one embodiment of a first and second phase signals that are non-overlapping and crossing around their high points during a phase cycle.
Figure 3B:
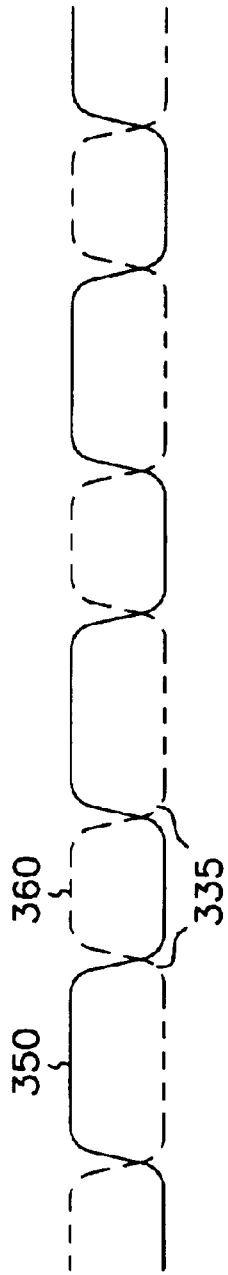
FIG. 3B is a timing diagram illustrating generally one embodiment of a first and second phase signals that are non-overlapping and crossing around their low points during a phase cycle.

FIG. 3A is a timing diagram illustrating generally by way of example but not by way of limitation one embodiment of portions of first and second phase signals 310 and 320 generated by first and second primary phase generators 210A and 210B respectively, that are non-overlapping and crossing around high points 315 during every phase cycle. Also shown are the sixth and fifth phase signals 330 and 340 generated by the first and second secondary phase generators 220A and 220B respectively, that is similar to the first and second phase signals, and including a pre-determined delay 't' from the first and second phase signals respectively.

FIG. 313 is a timing diagram illustrating generally by way of example but not by way of limitation one embodiment of portion of third and fourth phase signals 350 and 360 generated by the first and second primary phase generators 210A and 210D respectively, that are non-overlapping and crossing around low points 335 during every phase cycle.

Figure 4:
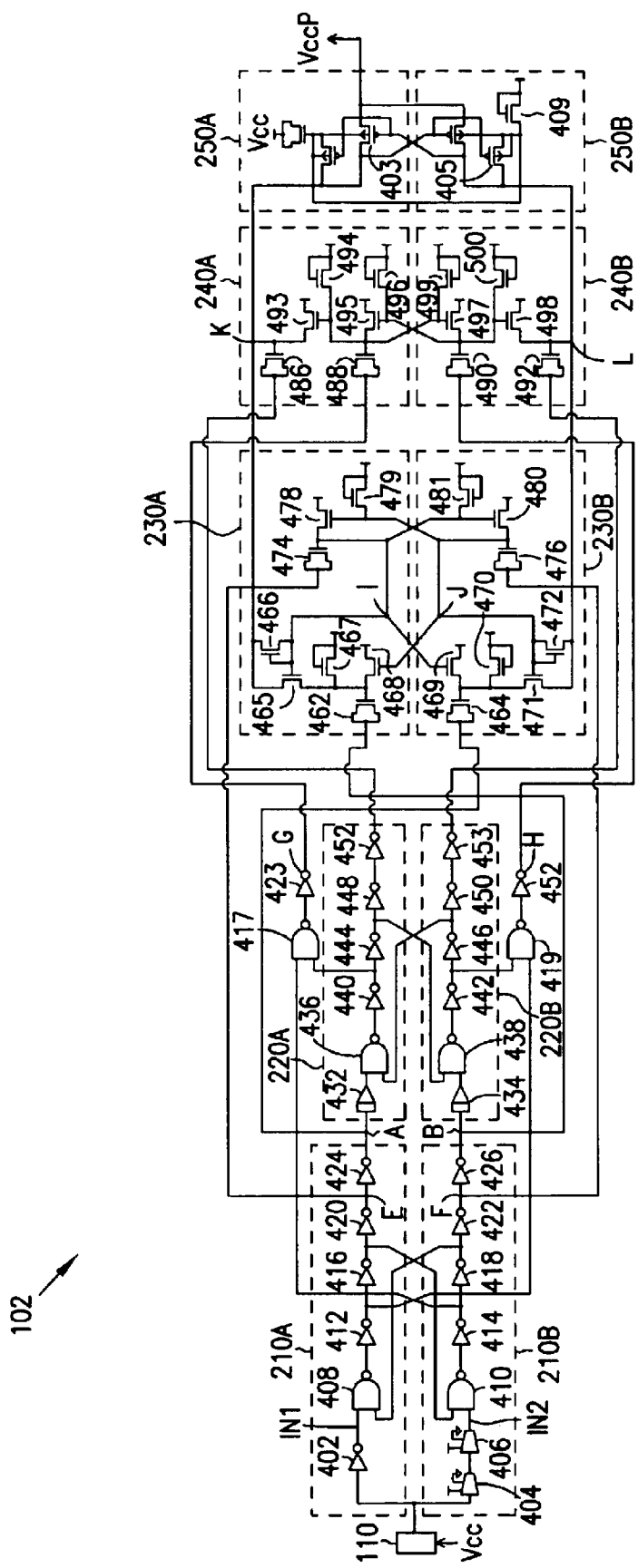
FIG. 4 is a schematic diagram illustrating generally one embodiment of a charge pump circuit of the present invention.

FIG. 4 is a schematic diagram illustrating generally by way of example but not by way of limitation one embodiment of a charge pump circuit. In this embodiment, the charge pump circuit 102 includes first and second primary phase generators 210A and 2101B, first and second secondary phase generators 220A and 220B, first and second pre-boot capacitors and associated precharge circuits 230A and 230B, first and second main pump capacitors and associated precharge circuits 240A and 240B, and a first and a second p-channel and associated circuitry 250A and 250B. The charge pump is designed symmetrically such that during a first phase the charge pump provides a pump voltage $V_{ccp}$ using one-half of the charge pump circuit and during the second phase $V_{ccp}$ is provided using the other-half of the charge pump circuit. The operation of the charge pump is described in detail below following a description of the charge pump circuit.

The first and second primary phase generators 210 and 210B have an oscillating input POSC, which receives an oscillating signal produced by oscillator 110 located in the integrated circuit 100. Inverter 402 and muxes 404 and 406 provide signals IN1 and IN2 which are 180 degrees out of phase with a crossing point very near $V_{cc}/2$. IN1 and IN2 are the inputs to the cross-coupled NAND gates 408 and 410. The cross-coupled NAND gates and subsequent invertors 412, 416, 420, 414, 418 and 422 provide third and fourth signals that are non-overlapping and crossing around low points of their signals during the first and second phases at node point E and F respectively. Subsequently invertors 424 and 426 provide first and second phase signals that are non-overlapping and crossing around high points of their signals during the first and second phases at nodes A and B respectively. The first and second phase signals coming from nodes A and B drive the first and second secondary phase generators 220A and 220B. The first and second secondary phase generators 220A and 220B generate fifth and sixth phase signals at nodes C and D, which are delayed from the first and second phase signals. Driving the first and second secondary phase generators 220A and 220B with an output of the first and second primary phase generators 210A and 210B provides an inherent delay though NAND gates 436 and 438, and further driving through invertors 440, 444, 448, 452, 442, 446, 450, and 453 of the first and second primary phase generators 210A and 210B. In one embodiment delays 432 and 434 can be added to provide additional delay to output the first and sixth phase signals for supply voltages operating above 1.5 volts. Delays 432 and 434 can be removed for supply voltages operating below 1.5 Volts. The fifth and sixth phase signals are similar to first and second phase signals, and only they have a predetermined delay from the first and second phase signals. This delay sets the amount of time necessary for pre-booting the first and second main capacitors 240A and 240B.

The first and second phase signals coming from nodes A and B also drive the first and second pre-boot capacitors 462 and 464 respectively. Whereas the third and fourth phase signals coming from nodes E and F drive the first and second pre-boot pre-charge capacitors 474 and 476 respectively. First and second pre-boot pre-charge capacitors 474 and 476 are responsible for recharging the first and second pre-boot capacitors 462 and 464. The first and second pre-boot pre-charge capacitors 474 and 476 are tied in a cross-coupled manner, such that they precharge each other through n-channel gates 478 and 480. The reason for third and fourth phase signals to be non-overlapping and crossing each other around their low points is that the gate of the first pre-boot precharge capacitor 474 should close low before the gate of second pre-boot precharge capacitor 476 goes high, otherwise the boost voltage of the second pre-boot precharge capacitor 476 would leak off through the precharge transistor 480. The gate nodes of these first and second pre-boot precharge capacitors 474 and 476 also drive the precharge transistors 468 and 469 of the pre-boot capacitors 462 and 464 respectively. Also the gate nodes of the first and second pre-boot precharge capacitors drive charge sharing transistors 465 and 471 which provide the path that charge shares the first and second pre-boot capacitors 462 and 464, to a first and second main pump capacitors 486 and 492 of a first and second main pump capacitor and associated pre-charge circuitry 240A and 240B to a pre-determined boot level. Diode transistors 467, 468, 469, 470, 479, and 481 are there for power-up. They charge-up first and second pre-boot capacitors 462 and 464, and first and second pre-boot precharge capacitors 474 and 476 at power-up, so that they can start pumping. Diode transistors 472 and 466 clamp gates of the first and second pre-boot precharge capacitors 474 and 476 to an n-channel VT above the gates of the first and second main pump capacitors 486 and 492 respectively. This helps to limit over-voltage and puts the excess charge onto the main pump cap where it can be passed to $V_{ccp}$.

The first and second secondary phase generators 220A and 220B work just like the first and second primary phase generators 210A and 210B except they get their input from the first and primary phase generators 210A and 210B instead of the POSC input received by the first and second primary phase generators 210A and 210B. The outputs of the first and second secondary phase generators are at nodes C and D (fifth and sixth phase signals). The outputs of signals at the first and second secondary phase generators 220A and 220B at nodes C and D (fifth and sixth phase signals) are similar to the outputs of signals at the nodes A and B (first and second phase signals), except they are delayed by the first and second secondary phase generators by a pre-determined delay. Again the fifth and sixth phase signals are non-overlapping and crossing around high points of their signals. Fifth and sixth phase signals coming from the first and second secondary phase generators 220A and 220B drive the first and second main pump capacitors 486 and 492 to a third pre-determined level respectively. Fifth and sixth signals are non-overlapping and crossing around high points because the signals at gate nodes of the first and main pump capacitors K and L cross around high points. The signals at nodes K and L needs to cross around high points, because they drive first and second p-channel circuitry 250A and 250B, which pass the charge from the first and second main capacitors 486 and 492 to $V_{ccp}$. Another reason it is desirable to have the fifth and sixth signals cross around high points, is that only one of the gates of the first and second p-channel circuitry 403 and 405 is on at any one time. This is because, any amount of time that both p-channel gates 403 and 405 are on, will rob charge from the $V_{ccp}$ by passing it back to the first and second main pump capacitors 486 and 492, which are trying to precharge. Nodes I and J cross at a low-low point similar to the nodes E and F that drive them through precharge capacitors 474 and 476. Nodes I and J precharge the preboot capacitors 462 and 464 to a fill $V_{cc}$ potential through the precharge gates 468 and 469.

The diode transistors 494, 496, 499, and 500 of the first and second main pump capacitor and associated circuitry 240A and 240B are for power-up. These diode transistors 494, 496, 499, and 500 provide a starting voltage to the first and second main pump precharge capacitors 488 and 490. Transistor 497 precharges the second main pump precharge capacitor 490, and transistor 495 precharges the first main pump precharge capacitor 488. The first and second main pump precharge capacitors 490 and 488 are used to precharge the first and second main pump capacitors 486 and 492 to a second predetermined level through precharge devices 493 and 498.The seventh and eighth phase signals coming from nodes G and H are supplied by AND-INVERTs 417, 423, 419, and 425 of nodes from the first and second primary and secondary phase generators 210A, 2101B, 220A and 220B respectively. The fifth and sixth phase signals from nodes G and H are small instead of the half cycle, because these signals should not be recharging the first and second main pump capacitors 486 and 492 while they are being pre-booted by the first and second pre-boot capacitors 462 and 464, otherwise the pre-boot charges will be shunted to $V_{cc}$.

In one embodiment the charge pump circuitry 102 enables to preboot one main pump capacitor while the other main pump capacitor is outputting the charge. This further enables to hide the preboot time, which in-turn enables the pump to run at a faster cycle time and hence a higher output charge. Also in this embodiment the charge pump circuitry 102 including staggered phase generators operating without a delay element at voltages lower than 1.5 Volts, with the pre-boot capacitors 486 and 492 adding a head room at voltages less than 1.5 Volts, and with the p-channel circuitry 250A and 250B giving an operating head room of about 800 millivolts, enables the charge pump circuitry to operate efficiently at supply voltages around 1.0 Volts.

Figure 5:
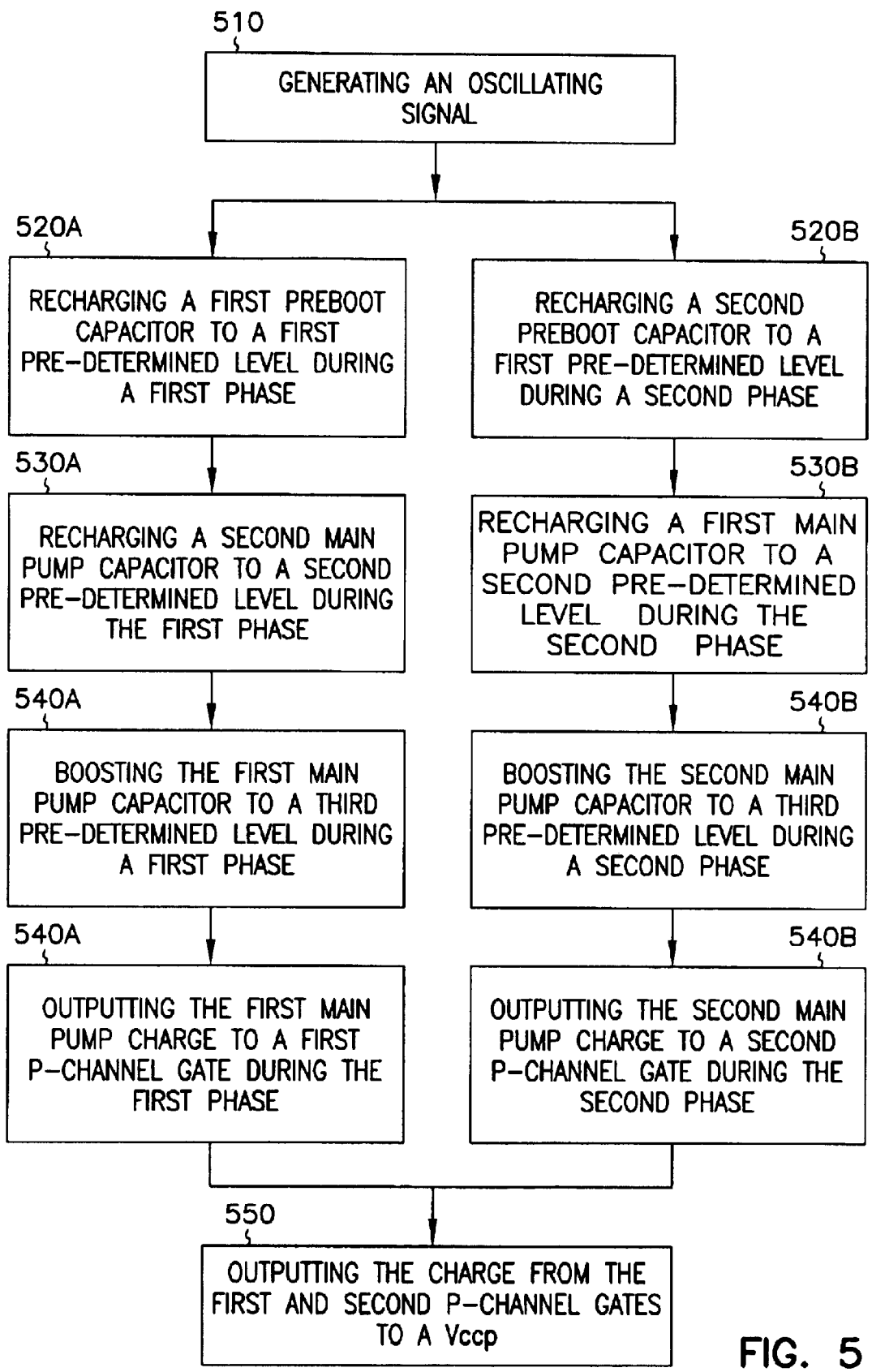
FIG. 5 is a flow chart illustrating one embodiment of the working of charge pump circuit of the present invention.

FIG. 5 is a flow diagram illustrating one embodiment of the working of a charge pump circuit of the present invention. The first step in the method of operating the charge pump is to generate an oscillating signal 510. In one embodiment the oscillating signal is input to a primary phase generator for generating first and second phase signals that are non-overlapping and crossing each other around their highest points during a phase cycle from the oscillating signal 510. Then the primary phase generator further generates third and fourth phase signals that are non-overlapping and crossing each other around their lowest points during each phase cycle from the oscillating signals 510. Then the primary phase generator further generates seventh and eighth phase signals. Then a secondary phase generator receives the first and second phase signals from the primary phase generator and generates a fifth and sixth phase signals similar to the first and second phase signals and having a pre-determined delay from the first and second phase signals. Then a first preboot capacitor and associated driving circuitry receives the first and third phase signals from the primary phase generator during the first phase, and preboots a first main pump to a first predetermined level during a first phase 520A. A second preboot capacitor and associated driving circuitry receives the second and fourth phase signals from primary phase generator during the second phase, and preboots a second main pump to a first predetermined level during the second phase 520B. A first main pump precharge capacitor receives the seventh phase signal from the primary phase generator, and the first main pump is further precharged by first main pump precharge capacitor during second phase to a second predetermined level 530B. A second main pump precharge capacitor receives the eighth phase signal from the primary phase generator, and the second main pump is further precharged by second main pump precharge capacitor during first phase to a second predetermined level 530A. Then in one embodiment the fifth phase signal from the secondary phase generator is input to raise the first main pump to a third predetermined level 530A and a charge is output from the first main pump during the first phase 540A. Then in this embodiment the sixth phase signal from the secondary phase generator is input to raise the second main pump to a third predetermined level 530B and a charge is output from the second main pump during the second phase 540B. The charge from the first main pump passes through the pass gate 1 (channel circuitry 1) to provide a pump voltage $V_{ccp}$ during the first phase 550, and the charge from the second main pump passes through the pass gate 2 (p-channel circuitry 2) to provide the pump voltage $V_{ccp}$ during the second phase 550. The charge pump is designed symmetrically, such that during a first phase the pump provides a pump voltage $V_{ccp}$ using one-half of the pump circuit and during the second phase $V_{ccp}$ is provided using the other-half of the circuit. This process repeats itself for every charge cycle and generally hides the preboot time required to pre-boot the first and second main capacitors 240A and 240B. As a result, the charge pump circuitry 102 can run at a faster cycle time resulting in outputting more charge for a given size of a capacitor.

Figure 6A:
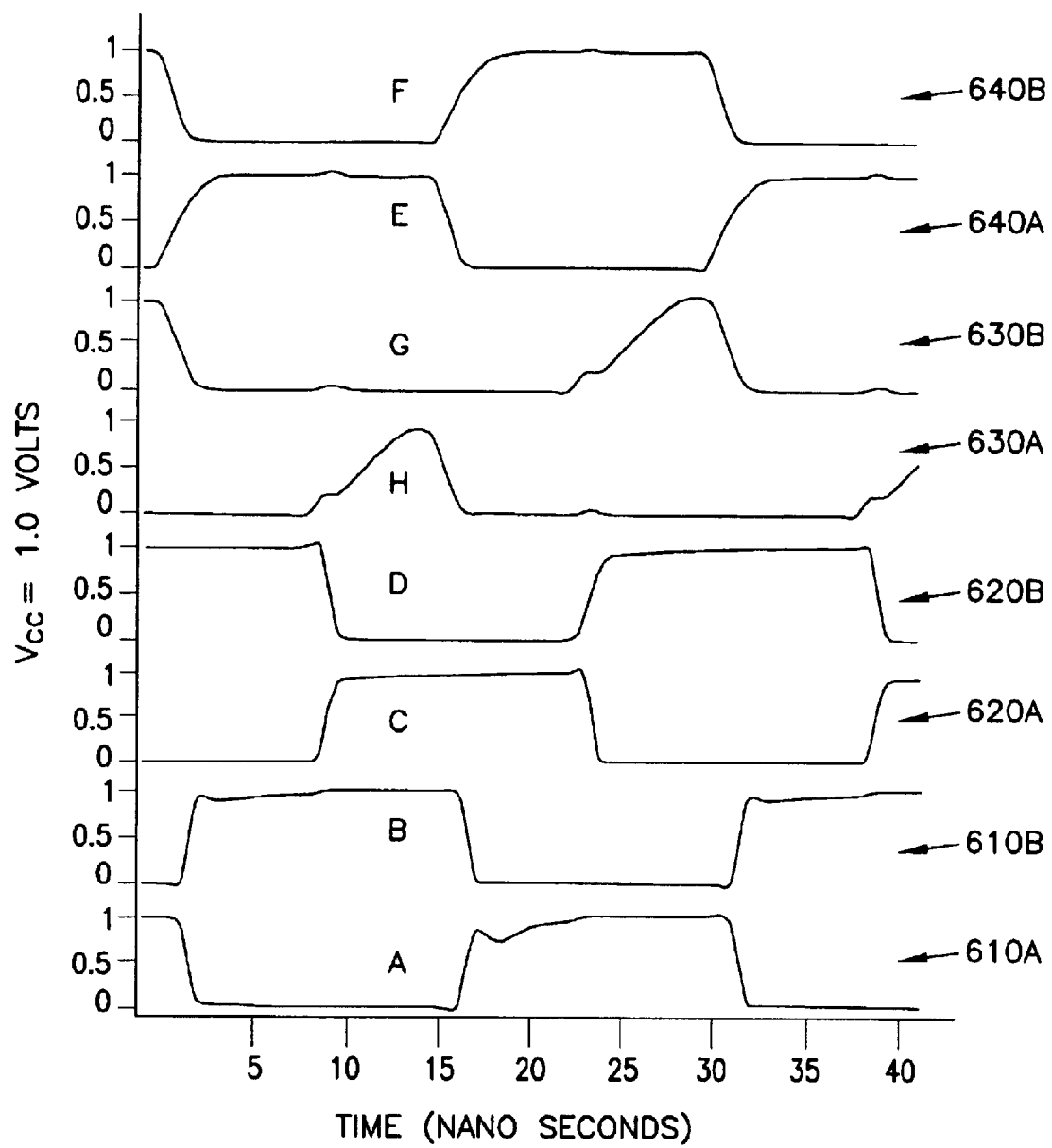
FIGS. 6A and 6B are timing diagrams illustrating generally one embodiment of signals generated at various node points when the supply voltage ($V_{cc}$) is around 1.0 volts.
Figure 6B:
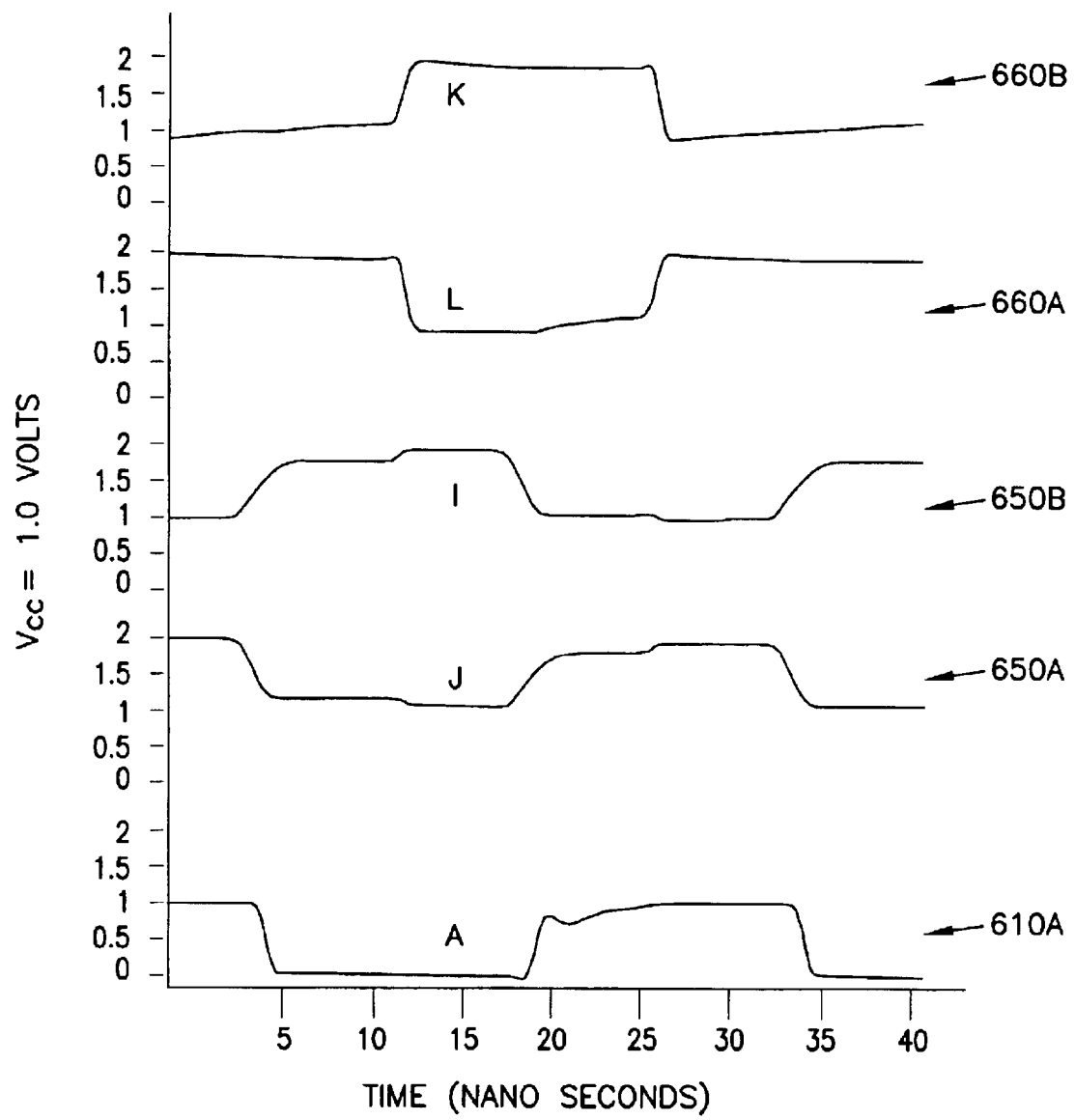

FIGS. 6A and 6B are timing diagrams illustrating generally one embodiment of signals at various node points when a supply voltage ($V_{cc}$) is around 1.0 volts. Timing diagrams 610A and 610B show first and second phase signals generated by a primary phase generator that are non-overlapping and crossing around their high points at nodes A and B during first and second phases. Timing diagrams 620A and 620B show fifth and sixth phase signals generated by a secondary phase generator (at nodes C and D) that are similar to the first and second phase signals, that are delayed from the first and second phase signals. Timing diagrams 630A and 630B show seventh and eighth phase signals generated by the primary phase generator (at nodes G and H) that are smaller instead of a half cycle, because these signals should not be recharging first and second main pump capacitors 486 and 492 while they are being pre-booted by first and second pre-boot capacitors 462 and 464, otherwise the pre-boot charges will be shunted to $V_{cc}$. Timing diagrams 640A and 640B show third and fourth signals generated by the primary phase generator (at nodes E and F), that are non over-lapping and crossing around their low points during the first and second phases. Timing diagrams 650A and 650B show that signals at nodes I and J cross around low points, similar to the signals at nodes E and F, that drive them through precharge capacitors 474 and 476. Also the signals at nodes I and J precharge the preboot capacitors 462 and 464 to a fill $V_{cc}$ potential through precharge gates 468 and 469. Timing diagrams 660A and 660B show that the signals at nodes K and L cross around their high points, because they drive the p-channel circuitry 250A and 250B, which pass the final charge from the first and second main pump capacitors 486 and 492 to $V_{ccp}$. FIGS. 6A and 6B generally illustrate one embodiment of the present invention outputting a higher voltage ($V_{ccp}$) of around 2.0 volts when the supply voltage ($V_{cc}$) is around 1.0 volts.

Figure 7A:
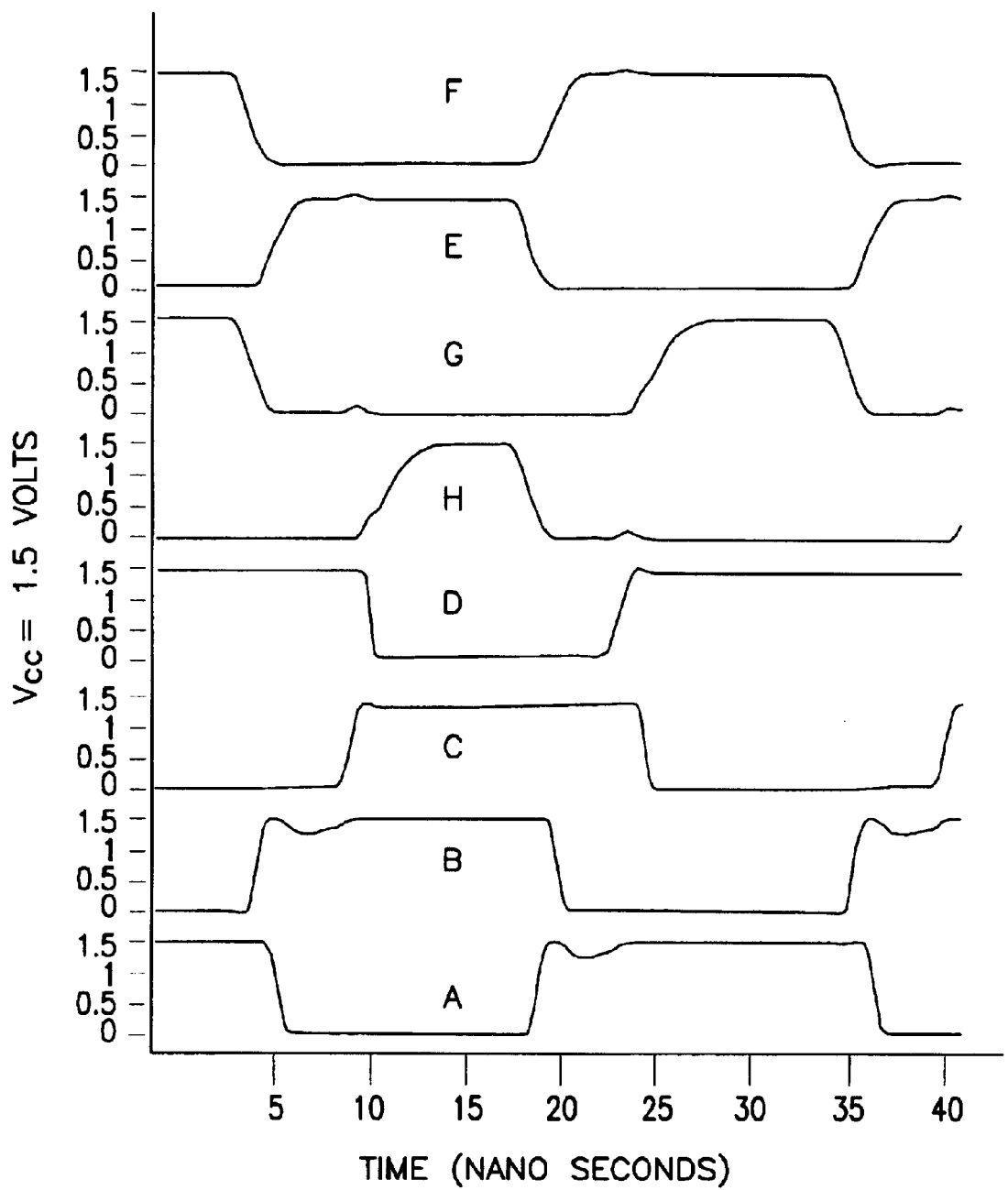
FIGS. 7A and 7B are timing diagrams illustrating generally another embodiment of signals generated at various node points when the supply voltage ($V_{cc}$) is around 1.5 volts.
Figure 7B:
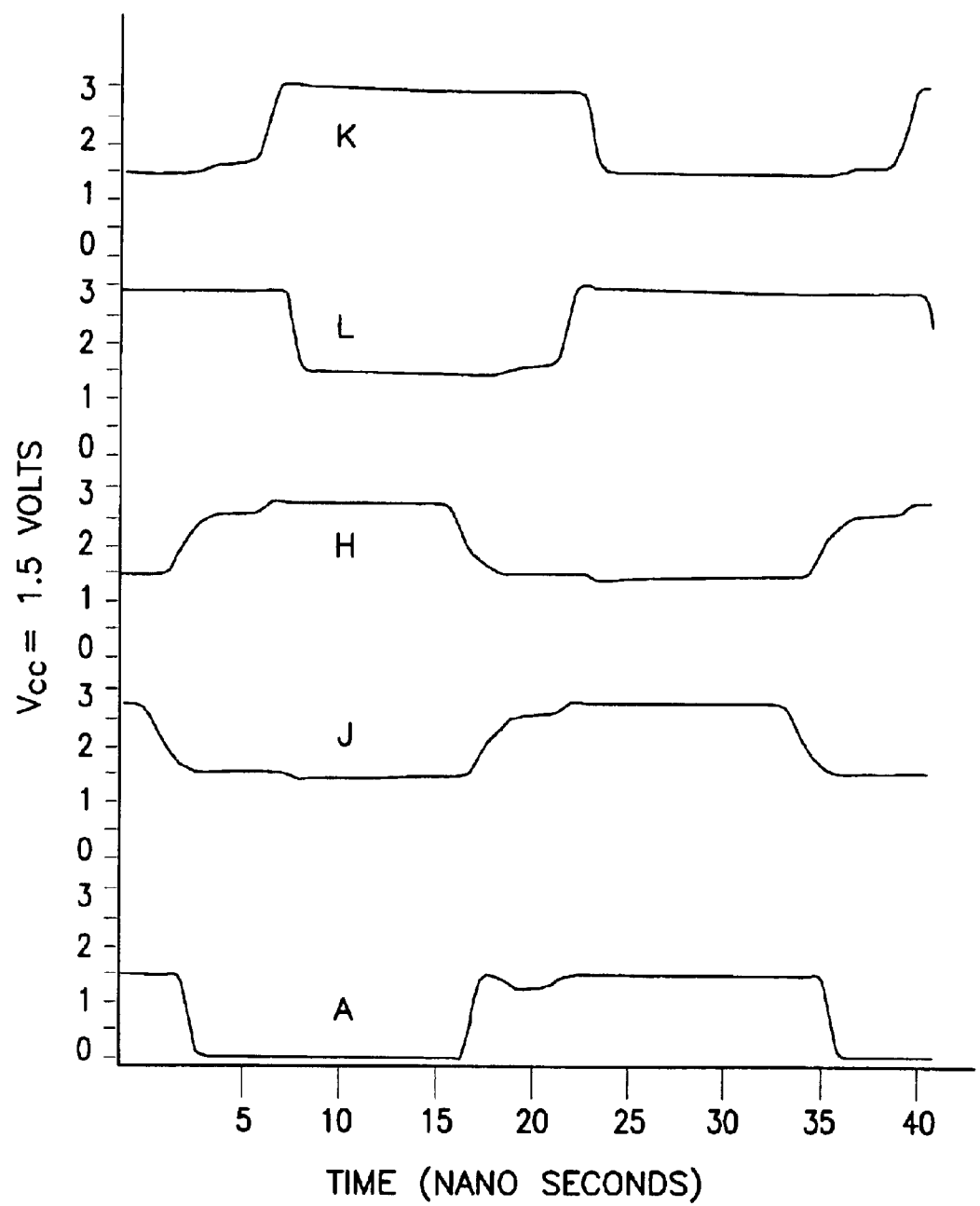

FIGS. 7A and 7B are similar to FIGS. 6A and 6B, except for the present invention outputting a higher voltage ($V_{ccp}$) of around 3.0 volts when the supply voltage ($V_{cc}$) is around 1.5 volts.

Figure 8A:
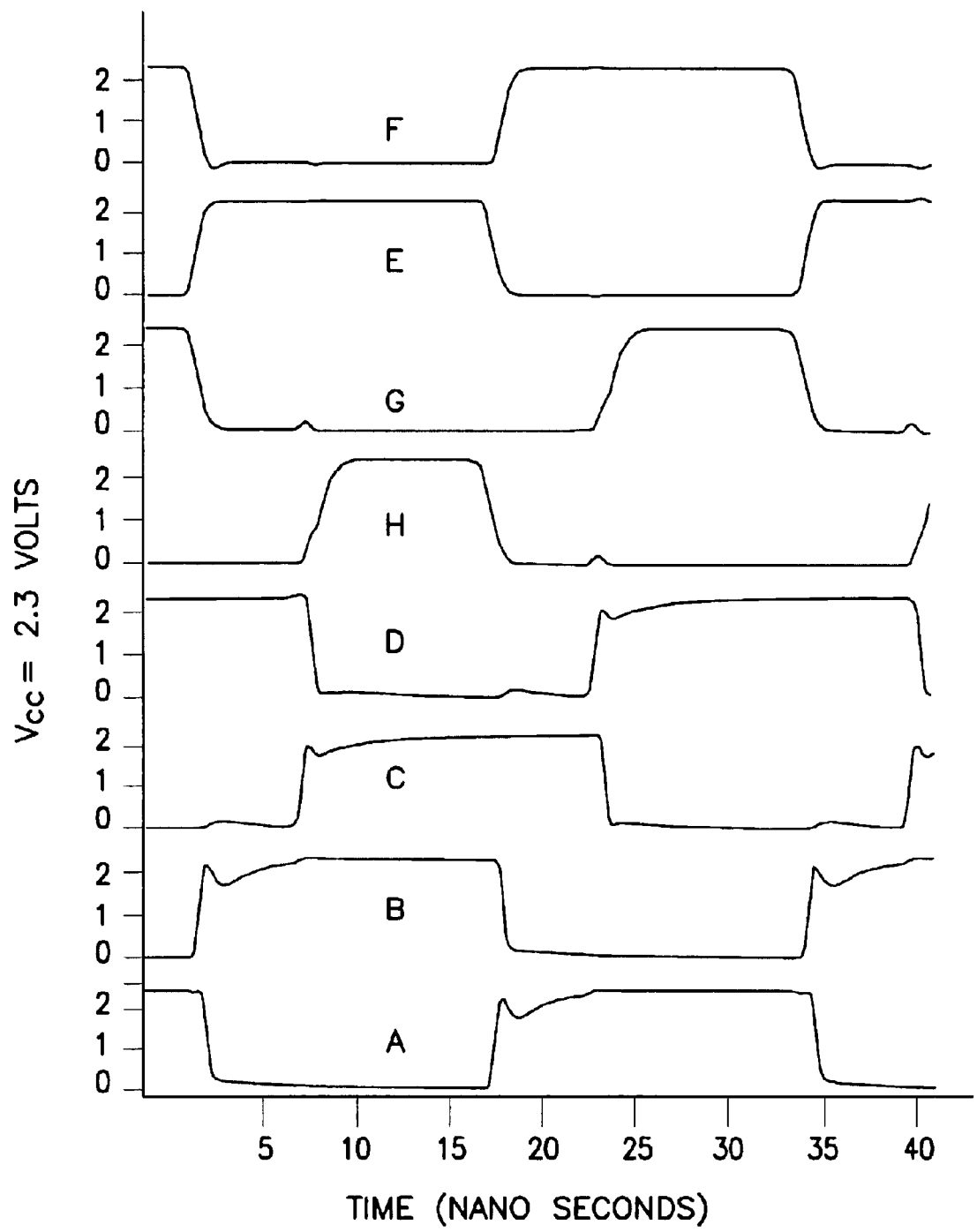
FIGS. 8A and 8B are timing diagrams illustrating generally another embodiment of signals generated at various node points when the supply voltage ($V_{cc}$) is around 2.3 volts.
Figure 8B:
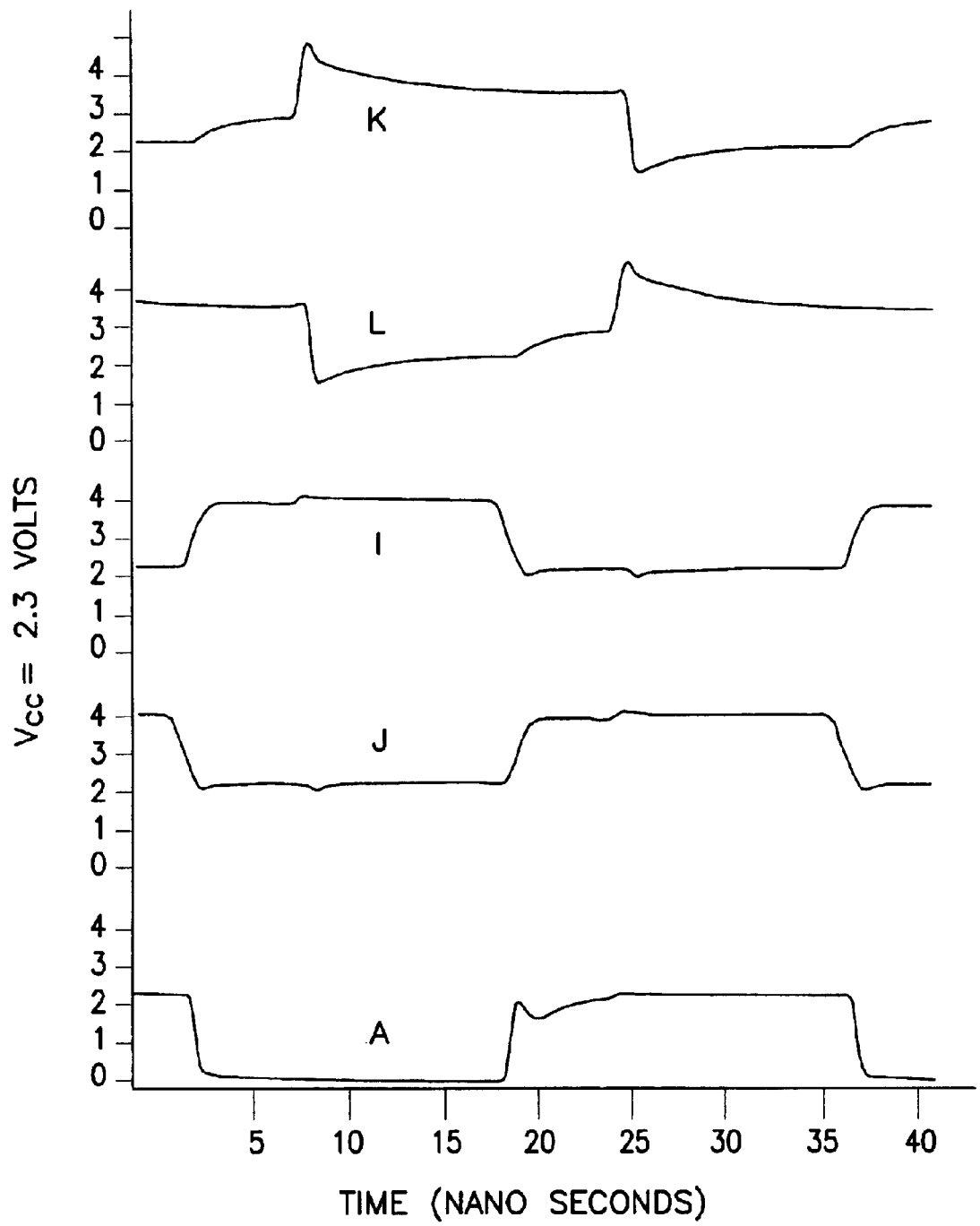

FIGS. 8A and 8B are similar to FIGS. 6A and 6B, except for present invention outputting a higher voltage ($V_{ccp}$) of around 4.0 volts when the supply voltage ($V_{cc}$) is around 2.3 volts.

Figure 9:
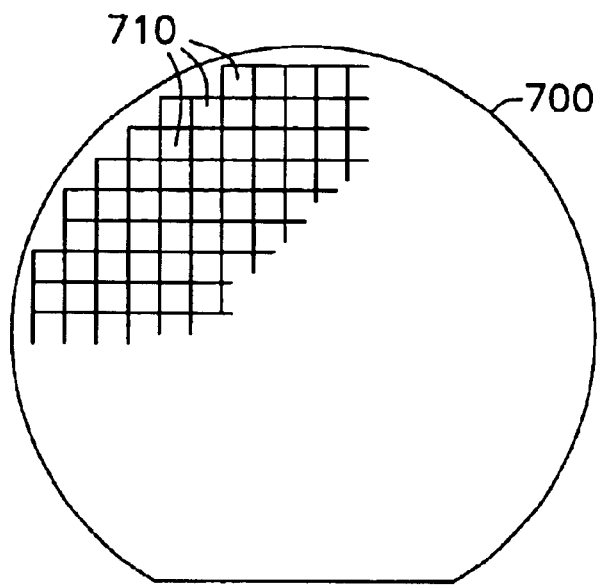
FIG. 9 is an elevation view of a substrate containing semiconductor dies.

With reference to FIG. 9, in one embodiment, a semiconductor die 710 is produced from a silicon wafer 700. A die is an individual pattern, typically rectangular, on a substrate that contains circuitry to perform a specific function. A semiconductor wafer will typically contain a repeated pattern of such dies containing the same functionality. Die 710 may contain circuitry for the inventive memory device, as discussed above. Die 710 may further contain additional circuitry to extend to such complex devices as a monolithic processor with multiple functionality. Die 710 is typically packaged in a protective casing (not shown) with leads extending therefrom (not shown) providing access to the circuitry of the die for unilateral or bilateral communication and control.

Figure 10:
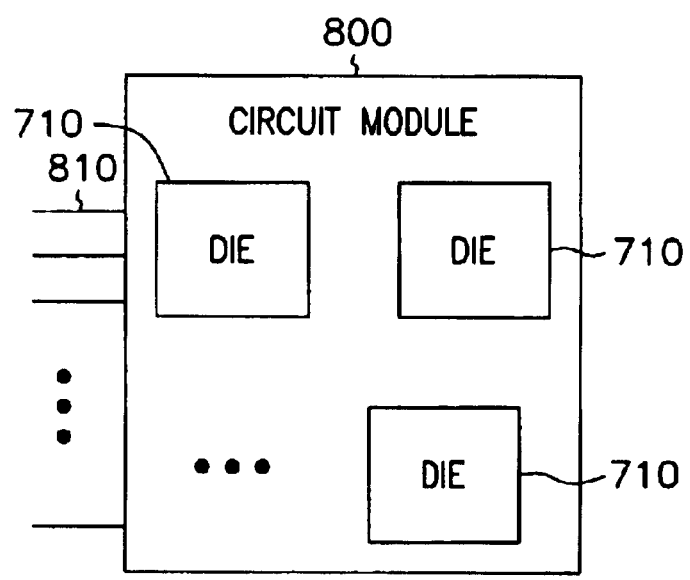
FIG. 10 is a block diagram of an exemplary circuit module.

As shown in FIG. 10, two or more dies 710 may be combined, with or without protective casing, into a circuit module 800 to enhance or extend the functionality of an individual die 710. Circuit module 800 may be a combination of dies 710 representing a variety of functions, or a combination of dies 710 containing the same functionality. Some examples of a circuit module include memory modules, device drivers, power modules, communication modems, processor modules and application-specific modules and may include multi-layer, multi-chip modules. Circuit module 800 may be a sub-component of a variety of electronic systems, such as a clock, a television, a cell phone, a personal computer, an automobile, an industrial control system, an aircraft and others. Circuit module 800 will have a variety of leads 810 extending therefrom providing unilateral or bilateral communication and control.

Figure 11:
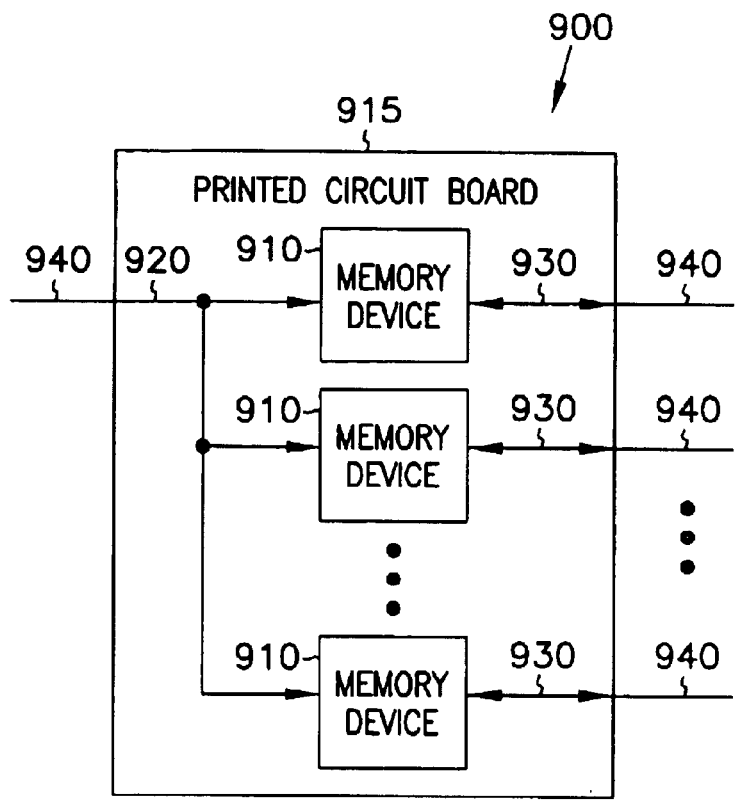
FIG. 11 is a block diagram of an exemplary memory module.

FIG. 11 shows one embodiment of a circuit module as memory module 900. Memory module 900 generally depicts a Single In-line Memory Module (SIMM) or Dual In-line Memory Module (DIAM). A SIMM or DIAM is generally a printed circuit board (PCB) or other support containing a series of memory devices. While a SIMM will have a single in-line set of contacts or leads, a DIAM will have a set of leads on each side of the support with each set representing separate I/O signals. Memory module 900 contains multiple memory devices 910 contained on support 915, the number depending upon the desired bus width and the desire for parity. Memory module 900 may contain memory devices 910 on both sides of support 915. Memory module 900 accepts a command signal from an external controller (not shown) on a command link 920 and provides for data input and data output on data links 930. The command link 920 and data links 930 are connected to leads 940 extending from the support 915. Leads 940 are shown for conceptual purposes and are not limited to the positions shown in FIG. 7.

Figure 12:
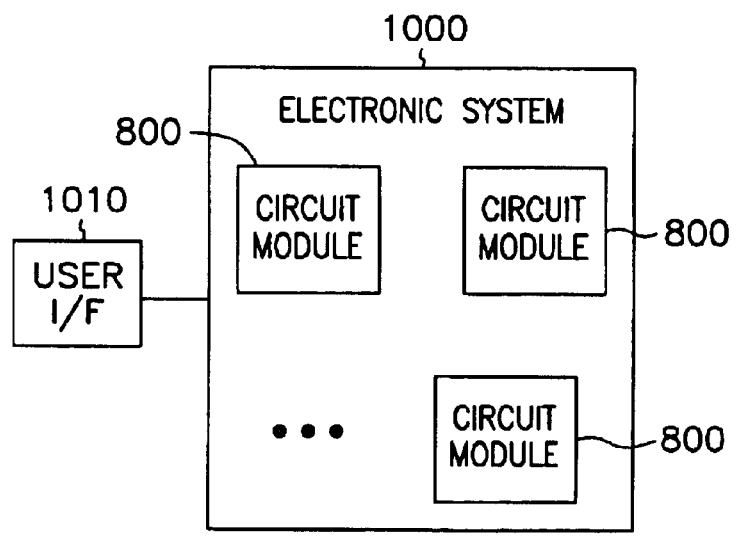
FIG. 12 is a block diagram of an exemplary electronic system.

FIG. 12 shows an electronic system 1000 containing one or more circuit modules 800. Electronic system 1000 generally contains a user interface 1010. User interface 1010 provides a user of the electronic system 1000 with some form of control or observation of the results of the electronic system 1000. Some examples of user interface 1010 include the keyboard, pointing device, monitor and printer of a personal computer, the tuning dial, display and speakers of a radio; the ignition switch and gas pedal of an automobile; and the card reader, keypad, display and currency dispenser of an automated teller machine. User interface 1010 may further describe access ports provided to electronic system 1000. Access ports are used to connect an electronic system to the more tangible user interface components previously exemplified. One or more of the circuit modules 800 may be a processor providing some form of manipulation, control or direction of inputs from or outputs to user interface 1010, or of other information either preprogrammed into, or otherwise provided to, electronic system 1000. As will be apparent from the lists of examples previously given, electronic system 1000 will often contain certain mechanical components (not shown) in addition to circuit modules 800 and user interface 1010. It will be appreciated that the one or more circuit modules 800 in electronic system 1000 can be replaced by a single integrated circuit. Furthermore, electronic system 1000 may be a sub-component of a larger electronic system.

Figure 13:
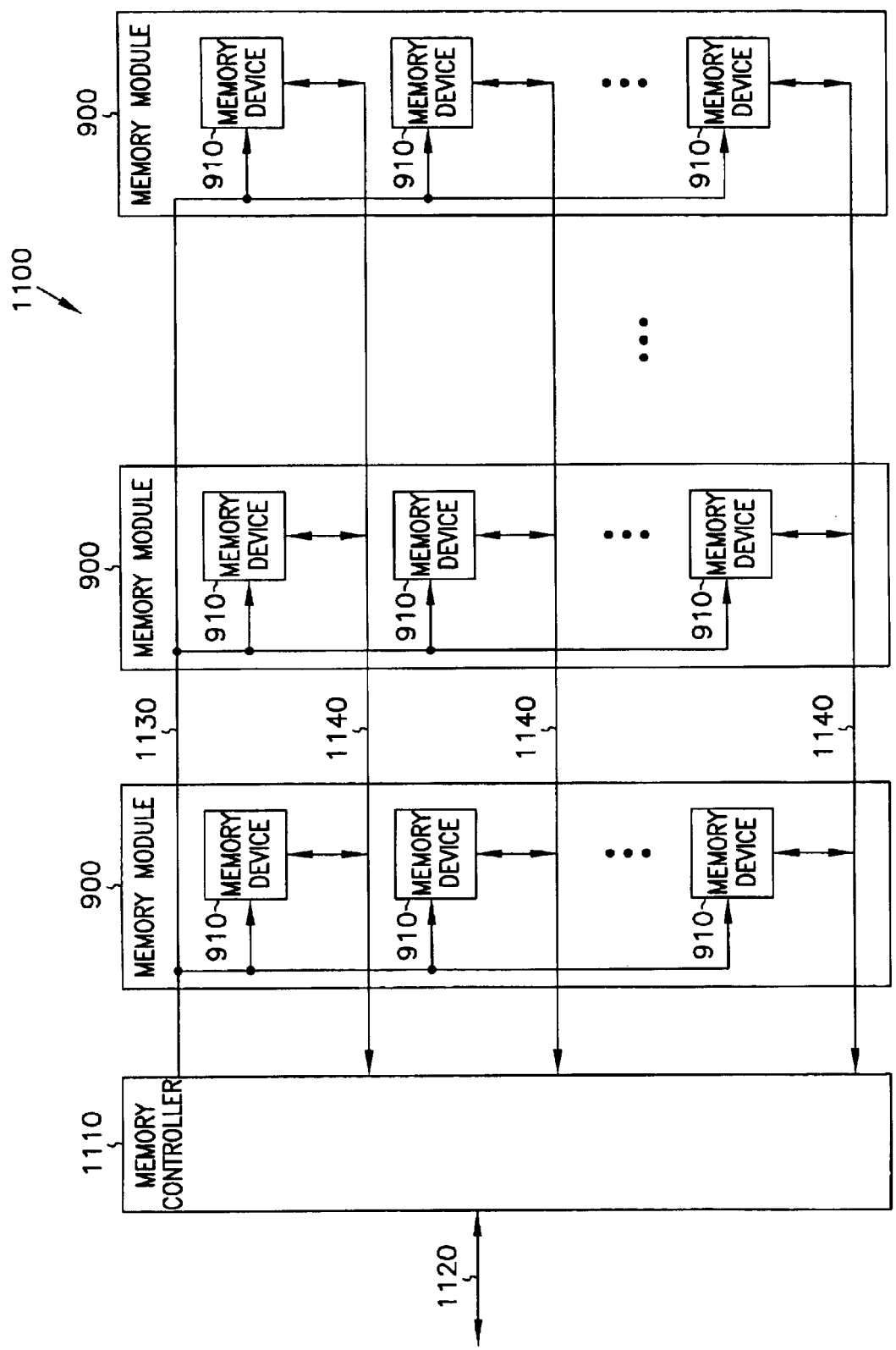
FIG. 13 is a block diagram of an exemplary memory system.

FIG. 13 shows one embodiment of an electronic system as memory system 1100. Memory system 1100 contains one or more memory modules 900 and a memory controller 1110. Memory controller 1110 provides and controls a bidirectional interface between memory system 1100 and an external system bus 1120. Memory system 1 100 accepts a command signal from the external bus 1120 and relays it to the one or more memory modules 900 on a command link 1130. Memory system 1100 provides for data input and data output between the one or more memory modules 900 and external system bus 1120 on data links 1140.

Figure 14:
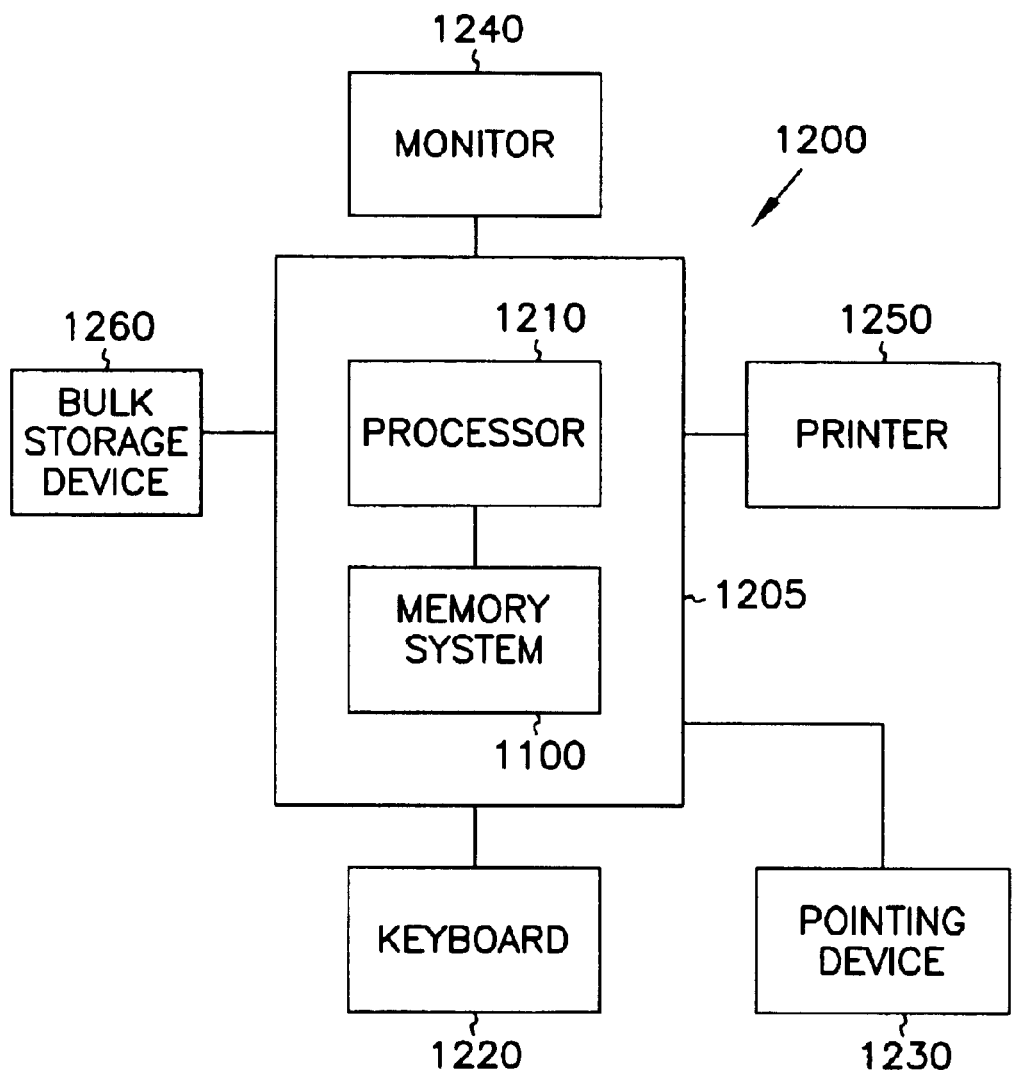
FIG. 14 is a block diagram of an exemplary computer system.

FIG. 14 shows a further embodiment of an electronic system as a computer system 1200. Computer system 1200 contains a processor 1210 and a memory system 1100 housed in a computer unit 1205. Computer system 1200 is but one example of an electronic system containing another electronic system, i.e. memory system 1100, as a sub-component. Computer system 1200 optionally contains user interface components. Depicted in FIG. 10 are a keyboard 1220, a pointing device 1230, a monitor 1240, a printer 1250 and a bulk storage device 1260. It will be appreciated that other components are often associated with computer system 1200 such as modems, device driver cards, additional storage devices, etc. It will further be appreciated that the processor 1210 and memory system 1100 of computer system 1200 can be incorporated on a single integrated circuit. Such single package processing units reduce the communication time between the processor and the memory circuit.

Conclusion

A low voltage two-phase charge pump is described which produces a $V_{ccp}$ voltage of up to or greater than 2 $V_{cc}$. The charge pump can operate at supply voltages of around 1 volt ($V_{cc}$). The head room of conventional charge pumps is overcome while reducing the power requirement and die area of other low voltage charge pumps. The charge pump uses two phase generators, delay elements, pre-boot capacitors, and requires only two main pump capacitors which are used 50% of the time. This is a substantial improvement over four-phase charge pumps which use 4 main pump capacitors that are active only 25% of the time. Also the two phase generators, which act together with a delay to produce the non-overlapping signals required to drive the charge and precharge capacitors to output the charge from one main capacitor in one phase and pre-boot the other main pump capacitor in the second phase, thereby hiding the pre-boot time and increasing the charge pump cycle time, which results in higher output for a given size of capacitor.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A charge pump, comprising:

a plurality of phase generators;

first and second preboot capacitors coupled to the plurality of phase generators, wherein each of the first and second preboot capacitors has an output;

first and second main pump capacitors coupled to the plurality of phase generators and the first and second preboot capacitors, respectively;

first and second main pump precharge capacitors coupled to the plurality of phase generators and coupled to the first and second main pump capacitors, respectively;

first and second pre-boot pre-charge capacitors, wherein each of the first and second preboot pre-charge capacitors has an output, and wherein the output of each of the first and second pre-boot pre-charge capacitors is coupled to the output of the first and second preboot capacitors, respectively; and first and second gating devices coupled to the first and second main pump capacitors, respectively, wherein the first and second main pump capacitors output a pump voltage higher than a supply voltage through the first and second gating devices.

2. The charge pump of claim 1, further comprising:

first and second sharing transistors coupled to the first and second pre-boot pre-charge capacitors and the first and second pre-boot capacitors to provide a path that charge shares the first and second pre-boot capacitors to the first and second main pump capacitors.

3. A charge pump, comprising:

a plurality of phase generators;

first and second preboot capacitors coupled to the plurality of phase generators, wherein each of the first and second preboot capacitors has an output;

first and second main pump capacitors coupled to the plurality of phase generators, and the first and second preboot capacitors, respectively;

first and second main pump precharge capacitors coupled to the plurality of phase generators and coupled to the first and second main pump capacitors, respectively;

first and second pre-boot pre-charge capacitors, wherein each of the first and second preboot pre-charge capacitors has an output, and wherein the output of each of the first and second pre-boot pre-charge capacitors is coupled to the output of the first and second preboot capacitors, respectively; and first and second gating devices coupled to the first and second main pump capacitors, respectively, wherein the first and second main pump capacitors are prebooted to a first predetermined level by the first and second preboot capacitors during the first and second phases, respectively, wherein the first predetermined level moves to a second predetermined level in response to the plurality of phase generators during the first and second phases, respectively, wherein the second predetermined level is moves to a third predetermined level in response to the plurality of phase generators during the first and second phases, respectively, wherein the third predetermined level is dumped to the first and second gating devices, during the first and second phases, respectively, and wherein the first and second main pump capacitors output a pump voltage higher than a supply voltage through the first and second gating devices.

4. A charge pump, comprising:

a plurality of phase generators;

first and second preboot capacitors coupled to the plurality of phase generators, wherein each of the first and second preboot capacitors has an output;

first and second main pump capacitors coupled to the plurality of phase generators, and the first and second preboot capacitors, respectively;

first and second main pump precharge capacitors coupled to the plurality of phase generators and coupled to the first and second main pump capacitors, respectively;

first and second pre-boot pre-charge capacitors, wherein each of the first and second pre-boot pre-charge capacitors has an output, and wherein the output of each of the first and second pre-boot pre-charge capacitors is coupled to the output of the first and second preboot capacitors, respectively; and first and second gating devices coupled to the first and second main pump capacitors, respectively, wherein the first and second main pump capacitors are prebooted to a first predetermined level by the first and second preboot capacitors during first and second phases, respectively, wherein the first predetermined level moves to a second predetermined level in response to the plurality of phase generators during the first and second phases, respectively, wherein the second predetermined level moves to a third predetermined level in response to the plurality of phase generators during the first and second phases, respectively, wherein the third predetermined level is dumped to the first and second gating devices, during the first and second phases, respectively, and wherein the first and second main pump capacitors output a pump voltage higher than a supply voltage through the first and second gating devices.

5. The charge pump of claim 4, wherein the plurality of phase generators comprises:

a primary phase generator; and a secondary phase generator coupled to the primary phase generator, wherein the first and second preboot capacitors are coupled to the primary phase generator, and the first and second main pump capacitors are coupled to the secondary phase generator and the first and second preboot capacitors, respectively.

6. A charge pump, comprising:

an oscillator to generate a first and a second phase during a phase cycle;

a primary phase generator coupled to the oscillator;

a secondary phase generator coupled to the primary phase generator;

first and second preboot capacitors coupled to the primary phase generator, wherein each of the first and second preboot capacitors has an output; first and second main pump capacitors coupled to the secondary phase generator, and the first and second preboot capacitors, respectively;

first and second main pump precharge capacitors coupled to one of the primary and secondary phase generators and coupled to the first and second main pump capacitors, respectively;

first and second pre-boot pre-charge capacitors, wherein each of the first and second pre-boot pre-charge capacitors has an output, and wherein the output of each of the first and second pre-boot pre-charge capacitors is coupled to the output of the first and second preboot capacitors, respectively; and first and second gating devices coupled to the first and second main pump capacitors, respectively, wherein the first and second main pump capacitors are prebooted to a first predetermined level by the first and second preboot capacitors during first and second phases, respectively, wherein the first predetermined level moves to a second predetermined level in response to the primary phase generator during the first and second phases, respectively, wherein the second predetermined level moves to a third predetermined level in response to the secondary phase generator during the first and second phases, respectively, wherein the third predetermined level is dumped to the first and second gating devices, during the first and second phases, respectively, and wherein the first and second main pump capacitors output a pump voltage higher than a supply voltage through the first and second gating devices.

7. The charge pump of claim 6, further including a power source, wherein the power source includes an output voltage approximately in the range of about 1 to 2.5 volts.

8. The charge pump of claim 6, wherein the primary phase generator comprises:

an inverter, coupled to the oscillator to receive an input signal from the oscillator based on the phase cycle and providing output signals which are 180 degrees out of phase; and cross coupled gates coupled to the inverter to receive the output signals from the inverter and outputting signals that are non-overlapping and crossing around high points of their signals during the first and second phases, respectively, and further outputting signals that are non-overlapping and crossing around low points of their signals during the first and second phases, respectively.

9. The charge pump of claim 6, wherein the secondary phase generator comprises a delay circuit coupled to the primary phase generator, including an input receiving signals that are non-overlapping and crossing around high points of their signals from the primary phase generator, and providing an output signal having a predetermined delay from the input signal.

10. The charge pump of claim 9, wherein the predetermined delay is approximately in the range of about 10 to 30 nanoseconds.

11. The charge pump of claim 9, wherein the first and second preboot capacitors are coupled to the primary phase generator to receive input signals that are non-overlapping and crossing around high points and low points of their signals, and provide an output signal to preboot the first and second main capacitors to the first predetermined level during the first and second phases, respectively.

12. The charge pump of claim 11, wherein the first predetermined level is approximately in the range of about 1 to 5 volts.

13. The charge pump of claim 11, wherein the first main pump precharge capacitor includes an input for receiving a signal among the signals that are non-overlapping and crossing around high points of their signals and includes an output for providing an output signal to precharge the first main pump precharge capacitor to the second predetermined level.

14. The charge pump of claim 13, wherein the second predetermined level is approximately in the range of about 1 to 5 volts.

15. The charge pump of claim 13, wherein the first and second precharge capacitors further comprise sharing transistors to precharge the first and second precharge capacitors.

16. The charge pump of claim 15, wherein the first and second main pump capacitors coupled to the secondary phase generator, and the first and second precharge capacitors, respectively, including an input receiving the delayed signal from the secondary phase generator to move the second predetermined level to the third predetermined level, and dumping an output during the first and second phases, respectively.

17. The charge pump of claim 16, wherein the third predetermined level is approximately in the range of about 1 to 5 volts.

18. The charge pump of claim 16, wherein the first and second gating devices coupled to the first and second main pump capacitors include an input to receive the dumped signal from the first and second main pump capacitors and an output to receive a charge to an external load.

19. The charge pump of claim 16, wherein the outputted charge is approximately in range of about 1.5 to 5 volts.

20. A charge pump, comprising:
an oscillator to generate first and second phases during a phase cycle;
a primary phase generator coupled to the oscillator;
a secondary phase generator coupled to the primary phase generator;
first and second preboot capacitors coupled to the primary phase generator, wherein each of the first and second preboot capacitors has an output;
first and second main pump capacitors coupled to the secondary phase generator, and the first and second preboot capacitors, respectively;
first and second main pump precharge capacitors coupled to one of the primary and secondary phase generators and coupled to the first and second main pump capacitors, respectively;
first and second pre-boot pre-charge capacitors, wherein each of the first and second pre-boot pre-charge capacitors has an output, and wherein the output of each of the first and second pre-boot pre-charge capacitors is coupled to the output of the first and second preboot capacitors, respectively; and
first and second gating devices coupled to the first and second main pump capacitors, respectively, wherein the first and second main pump capacitors are prebooted to a first predetermined level of approximately in the range of about 1 to 5 volts by the first and second preboot capacitors during the first and second phases, respectively, wherein the first predetermined level moves to a second predetermined level of approximately in the range of about 1 to 5 volts in response to the primary phase generator during the first and second phases, respectively, wherein the second predetermined level is moved to a third predetermined level of approximately in the range of about 1 to 1.5 volts in response to the secondary phase generator during the first and second phases, respectively, wherein the third predetermined level is dumped to the first and second gating devices, during the first and second phases, respectively, and wherein the first and second main pump capacitors output a pump voltage higher than a supply voltage through the first and second gating devices.

21. A charge pump, comprising:
an oscillator to generate a first and a second phase during a phase cycle;
a primary phase generator coupled to the oscillator further includes;
an inverter, coupled to the oscillator to receive an input signal from the oscillator based on the phase cycle and providing output signals which are 180 degrees out of phase; and
cross coupled gates coupled to the inverter to receive the output signals from the inverter and to output signals that are non-overlapping and crossing around high points of their signals during the first and second phases, respectively, and further to output signals that are non-overlapping and crossing around low points of their signals during the first and second phases, respectively;
a secondary phase generator coupled to the primary phase generator receives the signals that are non-overlapping and crossing around high points of their signals from the primary phase generator;
first and second preboot capacitors coupled to the primary phase generator receives the signals that non-overlapping and crossing around high points and low points of their signals from the primary phase generator, wherein each of the first and second preboot capacitors has an output;
first and second main pump capacitors coupled to the secondary phase generator, and the first and second preboot capacitors, respectively;
first and second main pump precharge capacitors coupled to one of the primary and secondary phase generators and coupled to the first and second main pump capacitors, respectively;
first and second pre-boot pre-charge capacitors, wherein each of the first and second preboot pre-charge capacitors has an output, and wherein the output of each of the first and second pre-boot pre-charge capacitors is coupled to the output of the first and second preboot capacitors, respectively; and
first and second gating devices coupled to the first and second main pump capacitors, respectively, wherein the first and second main pump capacitors are prebooted to a first predetermined level by the first and second preboot capacitors during the first and second phases, respectively, wherein the first predetermined level moves to a second predetermined level in response to the primary phase generator during the first and second phases, respectively, wherein the second predetermined level is moved to a third predetermined level in response to the secondary phase generator during the first and second phases, respectively, wherein the third predetermined level is dumped to the first and second gating devices, during the first and second phases, respectively, and wherein the first and second main pump capacitors output a pump voltage higher than a supply voltage through the first and second gating devices.

22. A charge pump, comprising:
an oscillator to generate a first phase and a second phase during a phase cycle;
first and second primary phase generators coupled to the oscillator,
first and second secondary phase generators coupled to the first and second primary phase generators, respectively;
first and second preboot capacitors coupled to the first and second primary phase generators, respectively, wherein each of the first and second preboot capacitors has an output;

a first main pump capacitor coupled to the first secondary phase generator and the first preboot capacitor;

a second main pump capacitor coupled to the second secondary phase generator and the second preboot capacitor;

first and second main pump precharge capacitors coupled to one of the primary and secondary phase generators and coupled to the first and second main pump capacitors, respectively;

first and second pre-boot pre-charge capacitors, wherein each of the first and second pre-boot pre-charge capacitors has an output, and wherein the output of each of the first and second pre-boot pre-charge capacitors is coupled to the output of the first and second preboot capacitors, respectively; and first and second p-channel gates coupled to the first and second main pump capacitors, respectively, wherein the first main pump capacitor is prebooted to a first pre-determined level by the first preboot capacitor during the first phase, wherein the first pre-determined level moves to a second predetermined level during the second phase in response to the first primary phase generator, wherein the second predetermined level moves to a third predetermined level in response to the first secondary phase generator, and wherein the third predetermined level dumped to a first p-channel gate during the first phase, and wherein the second main pump capacitor is prebooted to a first pre-determined level by the second preboot capacitor during the second phase, wherein the first predetermined level moves to a second pre-determined level during the first phase in response to the second primary phase generator, wherein the second predetermined level moves to a third predetermined level in response to the second secondary phase generator, and wherein the third predetermined level dumped to a second p-channel gate during the second phase, and wherein the first and second main pump capacitors output a pump voltage higher than a supply voltage through the first and second p-channel gates.

23. A charge pump circuit, comprising:

a phase generator to generate first and second phases during a phase cycle;

a primary phase generator, coupled to the phase generator, wherein the primary phase generator includes first and second phase generators to generate, first and second phase signals that are non-overlapping and crossing each other substantially around their high points during the phase cycle, wherein the primary phase generator further generates third and fourth phase signals that are non-overlapping and crossing around their low points during the phase cycle, and wherein the primary phase generator further generates seventh and eighth phase signals;

a secondary phase generator, coupled to the primary phase generator, wherein the secondary phase generator includes first and second secondary phase generators to generate fifth and sixth phase signals similar to the first and second phase signals, and including a predetermined delay from the first and second phase signals;

first and second main energy storing devices;

first and second main pump pre-charge capacitors coupled to one of the primary and secondary phase generators and coupled to the first and second main energy storing devices;

first and second pre-boosting stages, coupled to the first and second primary phase generators, respectively, wherein each of the first and second pre-boosting stages has an output, wherein the first and second pre-boosting stages boost the first and second main energy storing devices to a first predetermined boost level during the first and second phases respectively;

first and second pre-charging stages, coupled to the first and second main energy storing devices, wherein each of the first and second pre-charging stages has an output, and wherein the output of each of the first and second pre-charging stages is coupled to the output of the first and second pre-boosting stages, respectively; and first and second gating devices coupled to the first and second main energy storing devices, respectively, wherein the first and second pre-charging stages further boost the first and second main energy storing devices to a second predetermined boost level during the first and second phases, respectively, wherein the first and second main energy storing devices are further boosted to a third predetermined boost level by the fifth and sixth phase signals to allow the first and second main energy storing devices to output a desired level of a high-voltage signal through the first and second gating devices during the first and second phases.

24. A two-phase integrated circuit charge pump, comprising:

an oscillator, where the oscillator generates an oscillating signal during a phase cycle including first and second phases;

a primary phase generator, coupled to the oscillator, wherein the primary phase generator generates first and second phase signals that are non-overlapping and crossing each other around high points of their signals during a phase cycle, further the primary phase generator generates third and fourth phase signals that are non-overlapping and crossing each other around low points of their signals during every phase cycle, and further the primary phase generator generates seventh and eighth phase signals;

a secondary phase generator, coupled to the primary phase generator, wherein the secondary phase generator receives the first and second phase signals and generates fifth and sixth phase signals, respectively, that are non-overlapping and crossing each other around high points of their signals during a phase cycle and includes a predetermined delay from the first and second phase signals;

first and second pre-boot precharge capacitors, coupled to the primary phase generator, wherein each of the first and second pre-boot precharge capacitors has an output, wherein the first and second pre-boot precharge capacitors receive the third and fourth phase signals from the primary phase generator during the first and second phases, respectively;

first and second pre-boot capacitors, coupled to the primary phase generator, wherein each of the first and second pre-boot capacitors has an output, wherein the output of each of the first and second pre-boot pre-charge capacitors is coupled to the output of the first and second preboot capacitors, respectively, receives the first and second phase signals from the primary phase generator respectively, and wherein the first and second pre-boot precharge capacitors pre-charges the first and second pre-boot capacitors to a pre-determined level during the first and second phases respectively;

first and second main pump precharge capacitors, coupled to the primary phase generator, wherein the first and second main pump precharge capacitors receive the seventh and eighth phase signals from the primary phase generator during the first and second phases respectively;

a first main pump capacitor, coupled to the first main pump precharge capacitor, the second pre-boot capacitor, and the secondary phase generator, wherein the first pre-boot capacitor pre-boots the first main pump to a predetermined booted level during the first phase, further the first main pump precharge capacitor precharges the first main pump capacitor to a second pre-determined level during the second phase and further the first main pump capacitor receives the fifth phase signal from the secondary phase generator during the first phase, and where the first main pump capacitor goes to a third predetermined level and outputs a charge through a first p-channel gate during the first phase; and a second main pump capacitor, coupled to the second main pump precharge capacitor, the first pre-boot capacitor, and the secondary phase generator, wherein the second pre-boot capacitor pre-boots the second main pump to a predetermined booted level during the second phase, further the second main pump precharge capacitor precharges the second main pump capacitor to a second pre-determined level during the first phase, and further the second main pump capacitor receives the sixth phase signal from the secondary phase generator during the second phase, and where the second main pump capacitor goes to the third predetermined level and outputs the charge through a second p-channel gate during the second phase.

25. A two-phase charge pump for producing a pump voltage on an output line, comprising:

an oscillator, where the oscillator generates an oscillating signal;

a primary phase generator, coupled to the oscillator, generates first and second phase signals that are non-overlapping and crossing each other around high points of their signals during every phase cycle including first and second phases, further the primary phase generator generates third and fourth phase signals that are non-overlapping and crossing each other around low points of their signals during every phase cycle, and further the primary phase generator generates seventh and eighth phase signals;

a delay element, coupled to the primary phase generator, receives the first and second phase signals and generates fifth and sixth phase signals that are non-overlapping and crossing each other around high points of their signals during every phase cycle and includes a predetermined delay from the first and second phase signals;

a first and second pre-boot precharge circuitry, coupled to the primary phase generator, wherein the first and second pre-boot precharge circuitry has an output, receives the third and fourth signals from the primary phase generator during the first and second phases respectively;

a first and second pre-boot circuitry, coupled to the primary phase generator and the first and second pre-boot precharge capacitors respectively, wherein the first and second pre-boot circuitry has an output, wherein the output of the first and second pre-boot precharge circuitry is coupled to the output of the first and second pre-boot circuitry, receives the first and second phase signals from the primary phase generator respectively, and wherein the first and second pre-boot precharge circuitry pre-charges the first and second pre-boot capacitors to a pre-determined level during the first and second phases, respectively;

a first and second main pump precharge circuitry, coupled to the primary phase generator receives the seventh and eighth phase signals from the delay element during the first and second phases, respectively;

a first main pump circuitry, coupled to the first main pump precharge circuitry, the first pre-boot circuitry, and the delay element, where the first pre-boot circuitry pre-boots the first main pump circuitry to a predetermined booted level during the first phase, further the first main pump precharge circuitry precharges the first main pump circuitry to a second pre-determined level during the second phase and further the first main pump circuitry receives the fifth phase signal from the delay element during the first phase, and where the first main pump circuitry goes to a third predetermined level and outputs a charge through a first p-channel gate during the first phase; and a second main pump circuitry, coupled to the second main pump precharge circuitry, the second pre-boot circuitry, and the delay element, where the second pre-boot circuitry pre-boots the second main pump to a predetermined booted level during the second phase, further the second main pump precharge circuitry precharges the second main pump circuitry to a second pre-determined level during the first phase, and further the second main pump circuitry receives the sixth phase signal from the delay element during the second phase, and wherein the second main pump circuitry goes to the third predetermined level and outputs the charge through a second p-channel gate during the second phase.

26. A charge pump circuit, comprising:

a phase generator to generate first and second phases, wherein the first phase is 180 degrees out of phase with respect to the second phase;

a primary phase generator, coupled to the oscillator, generates first and second phase signals that are non-overlapping and crossing each other around high points of their signals during every phase cycle including the first and second phases, further the primary phase generator generates third and fourth phase signals that are non-overlapping and crossing each other around low points of their signals during every phase cycle, and further the primary phase generator generates seventh and eighth phase signals;

a secondary phase generator, coupled to the primary phase generator, receives the first and second phase signals and generates fifth and sixth phase signals, respectively, that are non-overlapping and crossing each other around high points of their signals during every phase cycle and includes a predetermined delay from the first and second phase signals;

first and second pre-boot precharge capacitors, wherein each of the first and second pre-boot precharge capacitors has an output, coupled to the primary phase generator, receives the third and fourth signals from the primary phase generator during the first and second phases respectively;

first and second pre-boot capacitors, coupled to the primary phase generator, wherein each of the first and second pre-boot capacitors has an output, wherein the output of each of the first and second pre-boot pre-charge capacitors is coupled to the output of the first and second pre-boot capacitors, respectively, receives the first and second phase signals from the primary phase generator respectively, and wherein the first and second pre-boot precharge capacitors pre-charges the first and second pre-boot capacitors to a predetermined level during the first and second phases, respectively;

first and second main pump precharge capacitors, coupled to the primary phase generator receives the seventh and eighth phase signals from the primary phase generator during the first and second phases, respectively;

a first main pump capacitor, coupled to the first main pump precharge capacitor, the first pre-boot capacitor, and the secondary phase generator, where the first pre-boot capacitor pre-boots the first main pump to a predetermined booted level during the first phase, further the first main pump precharge capacitor precharges the first main pump capacitor to a second pre-determined level during the second phase and further the first main pump capacitor receives the fifth phase signal from the secondary phase generator during the first phase, and where the first main pump capacitor goes to a third predetermined level and outputs a charge through a first p-channel gate during the first phase; and a second main pump capacitor, coupled to the second main pump precharge capacitor, the second pre-boot capacitor, and the secondary phase generator, where the second pre-boot capacitor pre-boots the second main pump to the predetermined booted level during the second phase, further the second main pump precharge capacitor precharges the second main pump capacitor to the second pre-determined level during the first phase, and further the second main pump capacitor receives the sixth phase signal from the secondary phase generator during the second phase, and where the second main pump capacitor goes to the third predetermined level and outputs the charge through a second p-channel gate during the second phase.

27. A memory device, comprising:

a plurality of phase generators;

first and second preboot capacitors coupled to the plurality of phase generators, wherein each of the first and second preboot capacitors has an output;

first and second main pump capacitors coupled to the plurality of phase generators, and the first and second preboot capacitors, respectively;

first and second main pump precharge capacitors coupled to the plurality of phase generators and coupled to the first and second main pump capacitors, respectively;

first and second pre-boot pre-charge capacitors, wherein each of the first and second pre-boot pre-charge capacitors has an output, and wherein the output of each of the first and second pre-boot pre-charge capacitors is coupled to the output of the first and second preboot capacitors, respectively; and first and second gating devices coupled to the first and second main pump capacitors, respectively, wherein the first and second main pump capacitors output a pump voltage higher than a supply voltage through the first and second gating devices.

28. A memory device, comprising:

a plurality of phase generators;

first and second preboot capacitors coupled to the plurality of phase generators, wherein each of the first and second preboot capacitors has an output;

first and second main pump capacitors coupled to the plurality of phase generators, and the first and second preboot capacitors, respectively;

first and second main pump precharge capacitors coupled to the plurality of phase generators and coupled to the first and second main pump capacitors, respectively;

first and second pre-boot pre-charge capacitors, wherein each of the first and second pre-boot pre-charge capacitors has an output, and wherein the output of each of the first and second pre-boot pre-charge capacitors is coupled to the output of the first and second preboot capacitors, respectively; and first and second gating devices coupled to the first and second main pump capacitors, respectively, wherein the first and second main pump capacitors are prebooted to a first predetermined level by the first and second preboot capacitors during first and second phases, respectively, wherein the first predetermined level moves to a second predetermined level in response to the plurality of phase generators during the first and second phases, respectively, wherein the second predetermined level moves to a third predetermined level in response to the plurality of phase generators during the first and second phases, respectively, and wherein the third predetermined level is dumped to the first and second gating devices, during the first and second phases, respectively, wherein the first and second main pump capacitors output a pump voltage higher than a supply voltage through the first and second gating devices.

29. A semiconductor die, comprising:

a substrate; and an integrated circuit supported by the substrate, wherein the integrated circuit comprises at least one memory device, further wherein the at least one memory device comprises:

a plurality of phase generators;

first and second preboot capacitors coupled to the plurality of phase generators, wherein each of the first and second preboot capacitors has an output;

first and second main pump capacitors coupled to the plurality of phase generators, and the first and second preboot capacitors, respectively;

first and second main pump precharge capacitors coupled to the plurality of phase generators and coupled to the first and second main pump capacitors, respectively;

first and second pre-boot pre-charge capacitors, wherein each of the first and second pre-boot pre-charge capacitors has an output, and wherein the output of each of the first and second pre-boot pre-charge capacitors is coupled to the output of the first and second preboot capacitors, respectively; and first and second gating devices coupled to the first and second main pump capacitors, respectively, wherein the first and second main pump capacitors output a pump voltage higher than a supply voltage through the first and second gating devices.

30. A semiconductor die, comprising:

a substrate; and an integrated circuit supported by the substrate, wherein the integrated circuit comprises at least one memory device, further wherein the at least one memory device comprises:

a plurality of phase generators;

first and second preboot capacitors coupled to the plurality of phase generators, wherein each of the first and second preboot capacitors has an output;

first and second main pump capacitors coupled to the plurality of phase generators, and the first and second preboot capacitors, respectively;

first and second main pump precharge capacitors coupled to the plurality of phase generators and coupled to the first and second main pump capacitors, respectively;

first and second pre-boot pre-charge capacitors, wherein each of the first and second pre-boot pre-charge capacitors has an output, and wherein the output of each of the first and second pre-boot pre-charge capacitors is coupled to the output of the first and second preboot capacitors, respectively; and first and second gating devices coupled to the first and second main pump capacitors, respectively, wherein the first and second main pump capacitors output a pump voltage higher than a supply voltage through the first and second gating devices.

31. A semiconductor die, comprising:

a substrate; and an integrated circuit supported by the substrate, wherein the integrated circuit comprises at least one memory device, wherein the at least one memory device comprises:

a plurality of phase generators;

first and second preboot capacitors coupled to the plurality of phase generators, wherein each of the first and second preboot capacitors has an output;

first and second main pump capacitors coupled to the plurality of phase generators, and the first and second preboot capacitors, respectively;

first and second main pump precharge capacitors coupled to the plurality of phase generators and coupled to the first and second main pump capacitors, respectively;

first and second pre-boot pre-charge capacitors, wherein each of the first and second pre-boot pre-charge capacitors has an output, and wherein the output of each of the first and second pre-boot pre-charge capacitors is coupled to the output of the first and second preboot capacitors, respectively; and first and second gating devices coupled to the first and second main pump capacitors, respectively, wherein the first and second main pump capacitors are prebooted to a first predetermined level by the first and second preboot capacitors during first and second phases, respectively, wherein the first predetermined level moves to a second predetermined level in response to the plurality of phase generators during the first and second phases, respectively, wherein the second predetermined level moves to a third predetermined level in response to the plurality of phase generators during the first and second phases, respectively, and wherein the third predetermined level is dumped to the first and second gating devices, during the first and second phases, respectively, wherein the first and second main pump capacitors output a pump voltage higher than a supply voltage through the first and second gating devices.

32. A memory system, comprising:

a controller;

a command link coupled to the controller;

a data link coupled to the controller; and a memory device coupled to the command link and the data link, wherein the memory device comprises:

a plurality of phase generators;

first and second preboot capacitors coupled to the plurality of phase generators, wherein each of the first and second preboot capacitors has an output;

first and second main pump capacitors coupled to the plurality of phase generators, and the first and second preboot capacitors, respectively;

first and second main pump precharge capacitors coupled to the plurality of phase generators and coupled to the first and second main pump capacitors, respectively;

first and second pre-boot pre-charge capacitors, wherein each of the first and second pre-boot pre-charge capacitors has an output, and wherein the output of each of the first and second pre-boot pre-charge capacitors is coupled to the output of the first and second preboot capacitors, respectively; and first and second gating devices coupled to the first and second main pump capacitors, respectively, wherein the first and second main pump capacitors output a pump voltage higher than a supply voltage through the first and second gating devices.

33. A memory system, comprising:

a controller;

a command link coupled to the controller;

a data link coupled to the controller; and a memory device coupled to the command link and the data link, wherein the memory device comprises:

a plurality of phase generators;

first and second preboot capacitors coupled to the plurality of phase generators, wherein each of the first and second preboot capacitors has an output;

first and second main pump capacitors coupled to the plurality of phase generators, and the first and second preboot capacitors, respectively;

first and second main pump precharge capacitors coupled to the plurality of phase generators and coupled to the first and second main pump capacitors, respectively;

first and second pre-boot pre-charge capacitors, wherein each of the first and second pre-boot pre-charge capacitors has an output, and wherein the output of each of the first and second pre-boot pre-charge capacitors is coupled to the output of the first and second preboot capacitors, respectively; and first and second gating devices coupled to the first and second main pump capacitors, respectively, wherein the first and second main pump capacitors are prebooted to a first predetermined level by the first and second preboot capacitors during first and second phases, respectively, wherein the first predetermined level moves to a second predetermined level in response to the plurality of phase generators during the first and second phases, respectively, wherein the second predetermined level moves to a third predetermined level in response to the plurality of phase generators during the first and second phases, respectively, and wherein the third predetermined level is dumped to the first and second gating devices, during the first and second phases, respectively, wherein the first and second main pump capacitors output a pump voltage higher than a supply voltage through the first and second gating devices.

34. An electronic system, comprising:
a processor; and
at least one memory device coupled to the processor, wherein the at least one memory device comprises:
   a plurality of phase generators;
   first and second preboot capacitors coupled to the plurality of phase generators, wherein each of the first and second preboot capacitors has an output;
   first and second main pump capacitors coupled to the plurality of phase generators, and the first and second preboot capacitors, respectively;
   first and second main pump precharge capacitors coupled to the plurality of phase generators and coupled to the first and second main pump capacitors, respectively;
   first and second pre-boot pre-charge capacitors, wherein each of the first and second pre-boot pre-charge capacitors has an output, and wherein the output of each of the first and second pre-boot pre-charge capacitors is coupled to the output of the first and second preboot capacitors, respectively; and
   first and second gating devices coupled to the first and second main pump capacitors, respectively, wherein the first and second main pump capacitors output a pump voltage higher than a supply voltage through the first and second gating devices.

35. An electronic system, comprising:
a processor; and
at least one memory device coupled to the processor, wherein the at least one memory device comprises:
   a plurality of phase generators;
   first and second preboot capacitors coupled to the plurality of phase generators, wherein each of the first and second preboot capacitors has an output;
   first and second main pump capacitors coupled to the plurality of phase generators, and the first and second preboot capacitors, respectively;
   first and second main pump precharge capacitors coupled to the plurality of phase generators and coupled to the first and second main pump capacitors, respectively;
   first and second pre-boot pre-charge capacitors, wherein each of the first and second pre-boot pre-charge capacitors has an output, and wherein the output of each of the first and second pre-boot pre-charge capacitors is coupled to the output of the first and second preboot capacitors, respectively; and
   first and second gating devices coupled to the first and second main pump capacitors, respectively,
   wherein the first and second main pump capacitors are prebooted to a first predetermined level by the first and second preboot capacitors during first and second phases, respectively, wherein the first predetermined level moves to a second predetermined level in response to the plurality of phase generators during the first and second phases, respectively, wherein the second predetermined level moves to a third predetermined level in response to the plurality of phase generators during the first and second phases, respectively, and wherein the third predetermined level is dumped to the first and second gating devices, during the first and second phases, respectively, wherein the first and second main pump capacitors output a pump voltage higher than a supply voltage through the first and second gating devices.

36. A method of producing a pump supply voltage from an integrated circuit two phase charge pump, comprising:
   pre-charging a pre-boot capacitor to a first pre-determined level during a first phase;
   pre-charging a second pre-boot capacitor to the first pre-determined level during a second phase;
   pre-charging a first main pump capacitor to a second pre-determined level during the second phase;
   boosting the first main pump to a third pre-determined level during the first phase;
   outputting the first main pump charge to a Vccp during the first phase through a first gating device;
   pre-charging the second main pump capacitor to the second pre-determined level during the first phase;
   boosting the second main pump to the third pre-determined level during the second phase; and
   outputting the second main pump charge to the Vccp during the second phase through a second gating device.

37. A method of producing a pump supply voltage from an integrated circuit two phase charge pump, comprising:
   pre-charging a pre-boot capacitor to a first pre-determined level during a first phase;
   pre-charging a second pre-boot capacitor to the first pre-determined level during a second phase;
   pre-charging a first main pump capacitor to a second pre-determined level during the second phase;
   boosting the first main pump to a third pre-determined level during the first phase;
   outputting the first main pump charge to a Vccp through a first p-channel gate during the first phase;
   pre-charging the second main pump capacitor to the second pre-determined level during the first phase;
   boosting the second main pump to the third pre-determined level during the second phase; and
   outputting the second main pump charge to the Vccp through a second p-channel gate during the second phase.

38. A method of producing a pump supply voltage from an integrated circuit two phase charge pump, comprising:
   pre-charging a pre-boot capacitor to a first pre-determined level during a first phase;
   pre-charging a second pre-boot capacitor to the first pre-determined level during a second phase;
   pre-charging a first main pump capacitor to a second pre-determined level during the second phase;
   boosting the first main pump to a third pre-determined level during the first phase;
   outputting the first main pump charge to a Vccp through a first p-channel gate during the first phase;
   pre-charging the second main pump capacitor to the second pre-determined level during the first phase;
   boosting the second main pump to the third pre-determined level during the second phase; and
   outputting the second main pump charge to the Vccp through a second p-channel gate during the second phase.

39. A method of producing a pump supply voltage from an integrated circuit two phase charge pump, comprising:
   generating signals that are non-overlapping and crossing each other around high points of their signals;
   generating signals that are non-overlapping and crossing each other around low points of their signals;
   generating signals having a predetermined delay from the signals that are non-overlapping and crossing each other around high points;

pre-charging a first pre-boot capacitor to a first pre-determined level using the signals that are non-overlapping and crossing around the high points of their signals during a first phase;

pre-charging a second pre-boot capacitor to the first pre-determined level using the signals that are non-overlapping and crossing around the low points of their signals during a second phase;

pre-charging the first main pump capacitor to a second pre-determined level by the signals that are non-overlapping and crossing around the low points of their signals during the second phase;

inputting the signals having a predetermined delay to boost the first main pump to a third pre-determined level during the first phase;

outputting the first main pump charge to a first p-channel gate during the first phase;

outputting the charge from the first channel gate to a Vccp;

pre-charging the second main pump capacitor to the second pre-determined level by the signals that are non-overlapping and crossing around the low points of their signals during the first phase;

inputting the signals having a predetermined delay to boost the second main pump to the third pre-determined level during the second phase;

outputting the second main pump charge to a second p-channel gate during the second phase; and outputting the charge from the second p-channel gate to the $V_{ccp}$.

40. A method of producing a pump supply voltage from an integrated circuit two phase charge pump, comprising:

generating an oscillating signal;

generating a first and second phase signals that are non-overlapping and crossing each other around high points of their signals during every phase cycle from the oscillating signal by a primary phase generator;

generating a third and fourth phase signals that are non-overlapping and crossing each other around low points of their signals during every phase cycle from the oscillating signal by the primary phase generator;

generating a fifth and sixth phase signals having a pre-determined delay from the first and second phase signals that are non-overlapping and crossing each other around high points from the first and second phase signals received from the primary phase generator by a secondary phase generator;

generating a seventh and eighth phase signals by the primary phase generator;

pre-charging a first pre-boot capacitor to a first pre-determined level using the first and third phase signals during the first phase;

pre-charging a second pre-boot capacitor to the first pre-determined level using the second and fourth phase signals during the second phase;

pre-booting a first main pump capacitor to the first pre-determined boot level by the first pre-boot capacitor during the first phase;

pre-booting a second main pump capacitor to the pre-determined boot level by the second pre-boot capacitor during the second phase;

pre-charging the first main pump capacitor to a second pre-determined level by the seventh phase signal during the second phase;

inputting the fifth phase signal to boost the first main pump to a third pre-determined level during the first phase;

outputting the first main pump charge to a first p-channel gate during the first phase;

outputting the charge from the first p-channel gate to a Vccp;

pre-charging the second main pump capacitor to the second pre-determined level by the eight phase signal during the first phase;

inputting the sixth phase signal to boost the second main pump to the third pre-determined level during the second phase;

outputting the second main pump charge to a second p-channel gate during the second phase; and outputting the charge from the second p-channel gate to the Vccp.

41. A method of producing a pump supply voltage from an integrated circuit two phase charge pump, comprising:

generating an oscillating signal;

generating a first and second phase signals that are non-overlapping and crossing each other around high points of their signals during every phase cycle from the oscillating signal by a primary phase generator;

generating a third and fourth phase signals that are non-overlapping and crossing each other around low points of their signals during every phase cycle from the oscillating signal by the primary phase generator;

generating a fifth and sixth phase signals having a pre-determined delay of approximately in the range of about 10 to 30 nanoseconds from the first and second phase signals that are non-overlapping and crossing each other around high points from the first and second phase signals received from the primary phase generator by a secondary phase generator;

generating a seventh and eighth phase signals by the primary phase generator;

pre-charging a first pre-boot capacitor to a first pre-determined level of approximately in the range of about 1 to 5 volts using the first and third phase signals during the first phase;

pre-charging a second pre-boot capacitor to the first pre-determined level of approximately in the range of about 1 to 5 volts using the second and fourth phase signals during the second phase;

pre-booting a first main pump capacitor to the first pre-determined boot level of approximately in the range of about 1 to 5 volts by the first pre-boot capacitor during the first phase;

pre-booting a second main pump capacitor to the pre-determined boot level of approximately in the range of about 1 to 5 volts by the second pre-boot capacitor during the second phase;

pre-charging the first main pump capacitor to a second pre-determined level of approximately in the range of about 1 to 5 volts by the seventh phase signal during the second phase;

inputting the fifth phase signal to boost the first main pump to a third pre-determined level of approximately in the range of about 1 to 5 volts during the first phase;

outputting the first main pump charge to a first p-channel gate during the first phase;

outputting the charge from the first p-channel gate to a Vccp;

pre-charging the second main pump capacitor to the second pre-determined level approximately in the range of about 1 to 5 volts by the eight phase signal during the first phase;

inputting the sixth phase signal to boost the second main pump to the third pre-determined level of approximately in the range of about 1 to 5 volts during the second phase;

outputting the second main pump charge to a second p-channel gate during the second phase; and outputting the charge from the second p-channel gate to the Vccp.

42. A method of producing a pump supply voltage in an integrated circuit, the method, comprising:

generating an oscillating signal;

generating a first and second phase signals that are non-overlapping and crossing each other around high points of their signals during every phase cycle from the oscillating signal by a primary phase generator;

generating a third and fourth phase signals that are non-overlapping and crossing each other around low points of their signals during every phase cycle from the oscillating signal by the primary phase generator;

generating a fifth and sixth phase signals from the first and second phase signals, where the fifth and sixth phase signals are similar to the first and second phase signals, and having a predetermined delay from the first and second phase signals by a secondary phase generator;

generating a seventh and eighth phase signals by the primary phase generator;

pre-charging a first pre-boot capacitor to a first pre-determined level using the first and third phase signals during the first phase;

pre-charging a second pre-boot capacitor to the first pre-determined level using the second and fourth phase signals during the second phase;

pre-booting a first main pump capacitor to the first pre-determined boot level by the first pre-boot capacitor during the first phase;

pre-booting a second main pump capacitor to the pre-determined boot level by the second pre-boot capacitor during the second phase;

pre-charging the first main pump capacitor to a second pre-determined level by the seventh phase signal during the second phase;

inputting the fifth phase signal to raise the first main pump to a third pre-determined level during the first phase;

outputting the first main pump charge to a Vccp through a first gating device during the first phase;

pre-charging the second main pump capacitor to the second pre-determined level by the eight phase signal during the first phase;

inputting the sixth phase signal to raise the second main pump to the third pre-determined level during the second phase; and outputting the second main pump charge to the Vccp through a second gating device during the second phase.

* * * * *

UNITED STATES PATENT AND TRADEMARK OFFICE
CERTIFICATE OF CORRECTION

PATENT NO. : 6,801,076 B1
DATED : October 5, 2004
INVENTOR(S) : Merritt

It is certified that error appears in the above-identified patent and that said Letters Patent is hereby corrected as shown below:

Column 2,
Lines 17 and 23, after "generates" delete "a".
Line 17, delete "a" before "second".
Line 19, delete "a" before "third".
Lines 27, 30, 34 and 38, after "includes" delete "a".
Line 50, after "out" insert -- . --.

Column 3,
Line 53, delete "complimentary" and insert -- complementary --, therefor.

Column 4,
Line 32, delete "includes" and insert -- include --, therefor.

Column 5,
Line 35, delete "first" and insert -- second --, therefor.
Line 35, delete "230A" and insert -- 230B --, therefor.
Line 41, delete "second" and insert -- first --, therefor.
Line 42, delete "230B" and insert -- 230A --, therefor.
Line 57, after "Also" insert -- , --.
Line 57, delete "sixth and fifth" and insert -- fifth and sixth --, therefor.
Line 62, delete "313" and insert -- 3B --, therefor.
Line 66, delete "210D" and insert -- 210B --, therefor.

Column 6,
Line 5, delete "2101B" and insert -- 210B --, therefor.
Line 55, delete "first and second" and insert -- second and first --, therefor.
Line 55, delete "462" and insert -- 464 --, therefor.
Line 56, delete "464" and insert -- 462 --, therefor.

Column 7,
Line 4, delete "first and second" and insert -- second and first --, therefor.
Line 5, delete "474 and 476" and insert -- 476 and 474 --, therefor.
Line 7, after "464" insert -- , --.
Line 14, after "467," delete "468, 469,".
Line 18, delete "472 and 466" and insert -- 466 and 472 --, therefor.
Line 21, after "492" insert -- , --.
Line 59, delete "fill" and insert -- full --, therefor.

UNITED STATES PATENT AND TRADEMARK OFFICE
CERTIFICATE OF CORRECTION

PATENT NO. : 6,801,076 B1
DATED : October 5, 2004
INVENTOR(S) : Merritt

It is certified that error appears in the above-identified patent and that said Letters Patent is hereby corrected as shown below:

Column 8,
Line 2, delete "490 and 488" and insert -- 488 and 490 --, therefor.
Line 7, delete "425" and insert -- 452 --, therefor.
Line 8, delete "2101B" and insert -- 2108 --, therefor.

Column 9,
Line 7, insert -- p- -- before "channel".
Line 47, delete "fill" and insert -- full --, therefor.

Column 10,
Line 54, delete "computer," and insert -- computer; --, therefor.

Column 12,
Line 45, delete "preboot" and insert -- pre-boot --, therefor.

Column 16,
Line 60, delete "," and insert -- ; --, therefor.

Column 27,
Line 19, insert -- p- -- before "channel".

Signed and Sealed this

Nineteenth Day of April, 2005

JON W. DUDAS
*Director of the United States Patent and Trademark Office*